US011122476B2

(12) United States Patent
Kim et al.

(10) Patent No.: US 11,122,476 B2
(45) Date of Patent: *Sep. 14, 2021

(54) METHOD AND DEVICE FOR SUPPORTING MACHINE TYPE COMMUNICATION IN WIRELESS COMMUNICATION SYSTEM

(71) Applicant: Samsung Electronics Co., Ltd., Suwon-si (KR)

(72) Inventors: Sang-Bum Kim, Suwon-si (KR); Jae-Hyuk Jang, Suwon-si (KR); Kyeong-In Jeong, Yongin-si (KR); Gert Jan Van Lieshout, Middlesex (GB); Soeng-Hun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/938,069

(22) Filed: Jul. 24, 2020

(65) Prior Publication Data

US 2020/0359281 A1 Nov. 12, 2020

Related U.S. Application Data

(63) Continuation of application No. 15/321,591, filed as application No. PCT/KR2015/006386 on Jun. 23, 2015, now Pat. No. 10,728,811.

(30) Foreign Application Priority Data

Jun. 23, 2014 (KR) .................. 10-2014-0076784
Jan. 9, 2015 (KR) .................. 10-2015-0003701

(51) Int. Cl.
*H04W 36/00* (2009.01)
*H04W 68/02* (2009.01)
(Continued)

(52) U.S. Cl.
CPC ........ *H04W 36/0094* (2013.01); *H04W 4/70* (2018.02); *H04W 36/30* (2013.01);
(Continued)

(58) Field of Classification Search
None
See application file for complete search history.

(56) References Cited

U.S. PATENT DOCUMENTS 9,408,127 B2 8/2016 Jung et al.
9,900,815 B2 2/2018 Jung et al.
(Continued)

FOREIGN PATENT DOCUMENTS

CN 1524392 A 8/2004
CN 1956590 A 5/2007
(Continued)

OTHER PUBLICATIONS

CATT, Impact Analysis of Extended Coverage, 3GPP TSG RAN WG2 Meeting #85, R2-140073, Feb. 9, 2014, Prague, Czech.
(Continued)

*Primary Examiner* — Bunjob Jaroenchonwanit
(74) *Attorney, Agent, or Firm* — Jefferson IP Law, LLP

(57) ABSTRACT

The present invention relates to a method and a device for machine type communication in a wireless communication system, and according to one embodiment of the present invention, a method for receiving a paging message in a wireless communication system for supporting MTC comprises the steps of: determining whether there is a terminal within a normal coverage (NC) or an extended coverage (EC), transmitting, to a network, state information including EC function support information and/or area display information of the NC or the EC according to the determination result; determining a paging receiving time according to an operation mode related to the state information, and receiv- (Continued)

ing the paging message according to the determined paging receiving time.

6 Claims, 21 Drawing Sheets

(51) Int. Cl.
*H04W 88/02* (2009.01)
*H04W 4/70* (2018.01)
*H04W 36/30* (2009.01)
*H04W 36/32* (2009.01)
*H04W 48/20* (2009.01)

(52) U.S. Cl.
CPC ........... *H04W 36/32* (2013.01); *H04W 48/20* (2013.01); *H04W 68/02* (2013.01); *H04W 88/02* (2013.01)

(56) References Cited

U.S. PATENT DOCUMENTS

| | | | |
|---|---|---|---|
| 2004/0203775 A1 | 10/2004 | Bourdeaut et al. | |
| 2005/0148349 A1 | 7/2005 | Putcha et al. | |
| 2007/0184834 A1* | 8/2007 | Jeong | H04W 48/04 455/434 |
| 2010/0222060 A1 | 9/2010 | Zhang et al. | |
| 2010/0265918 A1* | 10/2010 | Marinier | H04W 84/045 370/332 |
| 2011/0319080 A1 | 12/2011 | Bienas et al. | |
| 2012/0214497 A1 | 8/2012 | Shin et al. | |
| 2012/0309404 A1 | 12/2012 | Suzuki et al. | |
| 2013/0015953 A1 | 1/2013 | Hsu et al. | |
| 2013/0130684 A1 | 5/2013 | Gomes et al. | |
| 2013/0203450 A1 | 8/2013 | Mochizuki et al. | |
| 2014/0036874 A1 | 2/2014 | Jeong et al. | |
| 2014/0098761 A1 | 4/2014 | Lee et al. | |
| 2014/0220984 A1 | 8/2014 | Mandapaka et al. | |
| 2014/0329529 A1 | 11/2014 | Jung et al. | |
| 2015/0016282 A1 | 1/2015 | Su | |
| 2015/0296518 A1 | 10/2015 | Yi et al. | |
| 2015/0304918 A1 | 10/2015 | Jung et al. | |
| 2015/0304919 A1 | 10/2015 | Jung et al. | |
| 2015/0312851 A1 | 10/2015 | Ode | |
| 2016/0205666 A1 | 7/2016 | Huschke et al. | |
| 2016/0353342 A1 | 12/2016 | Futaki | |
| 2016/0381656 A1 | 12/2016 | Bevan et al. | |
| 2017/0048802 A1 | 2/2017 | Bucknell et al. | |
| 2017/0332224 A1 | 11/2017 | Han et al. | |
| 2019/0021049 A1* | 1/2019 | Martin | H04B 17/318 |
| 2020/0021452 A1* | 1/2020 | Sharma | H04L 63/1466 |

FOREIGN PATENT DOCUMENTS

| | | |
|---|---|---|
| CN | 101803244 A | 8/2010 |
| CN | 102300243 A | 12/2011 |
| JP | 2014-513499 A | 5/2014 |
| KR | 10-2013-0038256 A | 4/2013 |
| WO | 2009038368 A1 | 3/2009 |
| WO | 2013/066123 A1 | 5/2013 |
| WO | 2014-069944 A1 | 5/2014 |
| WO | 2015/114693 A1 | 8/2015 |

OTHER PUBLICATIONS

CATT, Paging coverage improvement details for MTC UEs, R1-140079, 3GPP TSG RAN WG1 Meeting #76, Feb. 9, 2014, Prague, Czech.
CATT, Capability signalling for Low Complexity MTC UE, 3GPP TSG-RAN WG2 Meeting #85, R2-140727, Feb. 9, 2014, Prague, Czech Republic.
RAN1, On mobility support for Low Complexity MTC UEs and MTC coverage enhancement, 3GPP TSG RAN WG2 Meeting #84, R2-133758, Nov. 13, 2013, San Francisco, USA.
Chinese Office Action dated Sep. 26, 2019, issued in a counterpart Chinese application No. 201580034340.9.
Japanese Office Action dated Nov. 21, 2019, issued in a counterpart Japanese application No. 2016-574976.
SONY; Enhanced Coverage Mobility Issues; 3GPP TSG-RAN WG2 Meeting #84; R2-133821; Nov. 11-15, 2013; San Francisco, CA.
Alcatel-Lucent Shanghai Bell et al.; Consideration on idle mode MTC UE in enhanced coverage; 3GPP TSG-WG RAN2#85; R2-140729; Feb. 10-14, 2014; Prague, Czech Republic.
Sony; Enhanced Coverage Issues; 3GPP TSG-RAN WG2 Meeting #85; R2-140825; Feb. 10-14, 2014; Prague, Czech Republic.
Chinese Office Action dated Mar. 27, 2019, issued in Chinese Application No. 201580034340.9.
Japanese Office Action dated Mar. 18, 2019, issued in Japanese Application No. 2016-574976.
Chinese Office Action dated Feb. 26, 2020, issued in a counterpart Chinese application No. 201580034340.9.

* cited by examiner

METHOD AND DEVICE FOR SUPPORTING MACHINE TYPE COMMUNICATION IN WIRELESS COMMUNICATION SYSTEM

CROSS-REFERENCE TO RELATED APPLICATION(S)

This application is a continuation application of prior application Ser. No. 15/321,591, filed on Dec. 22, 2016, which is a U.S. National Stage application under 35 U.S.C. § 371 of an International application number PCT/KR2015/006386 filed on Jun. 23, 2015, which will be issued as U.S. Pat. No. 10,728,811 on Jul. 28, 2020, which is based on and claimed priority under 35 U.S.C. § 119 to Korean Patent Application number 10-2014-0076784, filed on Jun. 23, 2014 in the Korean Intellectual Property Office, and under 35 U.S.C. § 119 to Korean patent application number 10-2015-0003701, filed on Jan. 9, 2015, in the Korean Intellectual Property Office, the disclosure of each of which are incorporated by reference herein in their entirety

TECHNICAL FIELD

The present disclosure relates to a method and apparatus for machine-type communication (MTC) in a wireless communication system.

BACKGROUND ART

With recent tremendous advances in wireless communication technologies, communication system techniques have also evolved over and over, and among these techniques, Long-Term Evolution (LTE) systems being standardized in the $3^{rd}$ Generation Partnership Project (3GPP) standardization organization have attracted much attention as a $4^{th}$-Generation (4G) wireless communication technique.

FIG. 1 illustrates a structure of an LTE system.

Referring to FIG. 1, a wireless access network of the LTE system includes evolved Nodes B (ENBs, Nodes B, or base stations) 105, 110, 115, and 120, a mobility management entity 125, and a serving gateway (S-GW) 130. A user equipment (UE or terminal) 135 connects to an external network through the ENBs 105 through 120 and the S-GW 130.

In FIG. 1, the ENBs 105 through 120 correspond to existing Nodes B in a Universal Mobile Telecommunication System (UMTS) system. The ENBs 105 through 120 are connected with the UE 135 through a radio channel and play more complicated roles than the existing Nodes B. In the LTE system, every user traffic as well as a real-time service such as Voice over Internet Protocol (VoIP) is provided through a shared channel, requiring a device for collecting state information of UEs, such as a buffer state, an available transmit power state, a channel state, etc., and performing scheduling based on the state information. Examples of such a device may be the ENBs 105 through 120. One ENB generally controls multiple cells. For instance, to implement a transmission speed of 100 Mbps or higher, the LTE system may use, for example, orthogonal frequency division multiplexing (OFDM) as a wireless connection scheme in a bandwidth of 20 MHz. Also, adaptive modulation & coding (AMC) is used in which a modulation scheme and a channel coding rate are determined depending on a channel state of a UE. The S-GW 130 is a device for providing a data bearer, and generates or removes the data bearer under control of the MME 125. The MME 125 is in charge of various control functions as well as a mobility management function for the UE, and is connected with the plurality of ENBs 105 through 120.

FIG. 2 illustrates a wireless protocol structure in an LTE system.

Referring to FIG. 2, the wireless protocol of the LTE system includes packet data convergence protocol (PDCP) layers 205 and 240, radio link control (RLC) layers 210 and 235, and medium access control (MAC) layers 215 and 230. The PDCP layers 205 and 240 manage operations such as compression/decompression of IP headers, and the RLC layers 210 and 235 reconfigure PDCP packet data units (PDCP PDUs) into a proper size. The MAC layers 215 and 230 are connected to several RLC-layer devices formed in one UE, and perform an operation of multiplexing RLC PDUs to a MAC PDU and de-multiplexing a MAC PDU into RLC PDUs. Physical (PHY) layers 220 and 225 channel-code and modulate upper layer data into OFDM symbols and transmit the OFDM symbols over a wireless channel; or demodulate and channel-decode OFDM symbols received over a wireless channel and transfer the decoded OFDM symbols to their upper layers. For further error correction in a physical layer, Hybrid ARQ (HARQ) is used, in which a reception end transmits 1 bit as information about whether a packet transmitted from a transmission end has ben received. This information is referred to as HARQ ACK/NACK information. Downlink (DL) HAQR ACK/NACK information for UL transmission is transmitted through a physical hybrid-ARQ indicator channel (PHICH) physical channel, and uplink (UL) HARQ ACK/NACK information for DL transmission is transmitted through a physical uplink control channel (PUCCH) or a physical uplink shared channel (PUCCH) physical channel.

In the LTE system, techniques for supporting various terminal types have been introduced, one of which supports a machine-type communication (MTC) UE. The MTC UE refers to a machine that performs communication for itself (e.g., on a time once per month) instead of being directly manipulated by a person such as an electric meter or a water meter, and also refers to a device to which connection may be attempted with low priority according to the aforementioned examples.

Among the MTC UEs, UEs used for the same purpose as the aforementioned meter do not need a high-performance data transmission capability and may have a low transmit power. The MTC UE may be installed in a poor communication environment such as an underground or a warehouse, even if having the same reception performance as a general UE. Hence, a need has emerged to distinguish a separate UE type requiring a coverage extension (CE) or an extended coverage (EC) function for overcoming a low transmit power with a low transmission speed. To this end, LTE release 12 (release refers to version information and higher version refers to newer version) newly defines the aforementioned type UE as Category #0 in addition to existing UE categories (or category is classified according DL/UL transmission speeds of the UE, and for example, a UE corresponding to Category #4 supports a DL speed of 150 Mbps and a UE corresponding to Category #5 supports a DL speed of 300 Mbps). The UE corresponding to Category #0 has a low transmission speed (e.g., 1 Mbps), and may operate in a CE mode to secure a broad coverage in spite of a low transmission power. For this end, a separate additional transmission method may be used. The separate additional transmission method may be repeated transmission or the like. Thus, the UE corresponding to Category #0 may be used as an MTC UE.

Meanwhile, if the MTC UE needs a broad coverage, the CE mode may be applied for application of the separate additional transmission method (e.g., repeated transmission, etc.) to every data transmitted and received by the MTC UE. For example, a network sends a paging message for waking up sleeping UEs to allow the UEs to receive incoming calls (or receive phone calls). This scheme is applied to every UE as well as the MTC UE. However, if the network has no information about the MTC UE, the BS, when sending the paging message, does not know whether a UE to receive the paging message is a normal UE or an MTC UE, inevitably having to send every message by using the additional transmission (e.g., repeated transmission, etc.,). Such unnecessary repeated transmission results in waste of radio resources, and a resource that needs to be used for data transmission is used for control message transmission, degrading a transmission speed. Therefore, this problem has to be solved.

Another problem is that the MTC UE has difficulty in using an existing method when performing cell selection and re-selection. The performance of a receiver of the MTC UE may be lower than that of a normal UE, and even if having the same receiver performance as the normal UE, the MTC UE is highly likely to be installed in a poorer environment than with the normal UE. As a result, when attempting cell selection using an existing method, the MTC UE may not find a proper serving cell. In another way, if the MTC UE is capable of selecting a serving cell by using an existing method, it may be desirable to avoid searching for a serving cell in a CE mode. This is because the MTC UE is provided with a lower-quality and lower-efficiency service than in an existing UE in the CE mode. In cell re-selection, the UE re-selects a serving cell based on frequency priority information provided from the BS. In this case, when re-selecting each frequency, the MTC UE needs to consider connection in the CE mode.

DETAILED DESCRIPTION OF THE INVENTION

Technical Problem

The present disclosure provides an efficient communication method and apparatus for an MTC UE in a wireless communication system.

The present disclosure also provides a method and apparatus for efficiently transmitting and receiving a paging message in a wireless communication system that supports MTC.

The present disclosure also provides a method and apparatus for efficiently performing cell selection and cell re-selection in a wireless communication system that supports MTC.

Technical Solution

According to an embodiment of the present disclosure, there is provided a method for receiving a paging message in a wireless communication system that supports machine-type communication (MTC), the method including determining whether a user equipment (UE) falls within a normal coverage (NC) or an extended coverage (EC), transmitting, to a network, state information including at least one of EC function support information and area indication information of the NC or the EC, based on a result of the determination, determining a paging reception time according to an operation mode associated with the state information, and receiving the paging message according to the determined paging reception time.

According to another embodiment of the present disclosure, there is provided a UE for receiving a paging message in a wireless communication system that supports MTC, the UE including a transceiver configured to transmit and receive messages for receiving the paging message, and a controller configured to determine whether the UE falls within an NC or an EC, to transmit, to a network, state information including at least one of EC function support information and area indication information of the NC or the EC, based on a result of the determination, to determine a paging reception time according to an operation mode associated with the state information, and to receive the paging message according to the determined paging reception time.

According to another embodiment of the present disclosure, there is provided a method for performing cell selection in a wireless communication system that supports MTC, the method including performing cell discovery and measurement for the cell selection and performing the cell selection by applying a second criterion for the cell selection to which a compensation value for an EC is applied, if there is no cell that satisfies a first criterion for the cell selection.

According to another embodiment of the present disclosure, there is provided a UE for performing cell selection in a wireless communication system that supports MTC, the UE including a receiver configured to receive system information for the cell selection and a controller configured to perform cell discovery and measurement for the cell selection, and to perform the cell selection by applying a second criterion for the cell selection to which a compensation value for an EC is applied, if there is no cell that satisfies a first criterion for the cell selection.

According to another embodiment of the present disclosure, there is provided a method for performing cell re-selection in a wireless communication system that supports MTC, the method including receiving system information comprising parameter information for the cell re-selection and calculating a first criterion based on an existing scheme and a second criterion based on an EM, respectively, for the cell re-selection with respect to neighboring cells, by using the parameter information, and performing the cell re-selection.

According to another embodiment of the present disclosure, there is provided a UE for performing cell re-selection in a wireless communication system that supports MTC, the UE including a receiver configured to receive system information comprising parameter information for the cell re-selection and a controller configured to calculate a first criterion based on an existing scheme and a second criterion based on an EM, respectively, for the cell re-selection with respect to neighboring cells, by using the parameter information, and to perform the cell re-selection.

MODE FOR CARRYING OUT THE INVENTION

A detailed description of well-known functions or elements associated with embodiments of the present disclosure will be omitted if it unnecessarily obscure the subject matter of the present disclosure. The following embodiments will be separately described for convenience, but at least two embodiments may be implemented in combination without colliding with each other.

Figure 1:
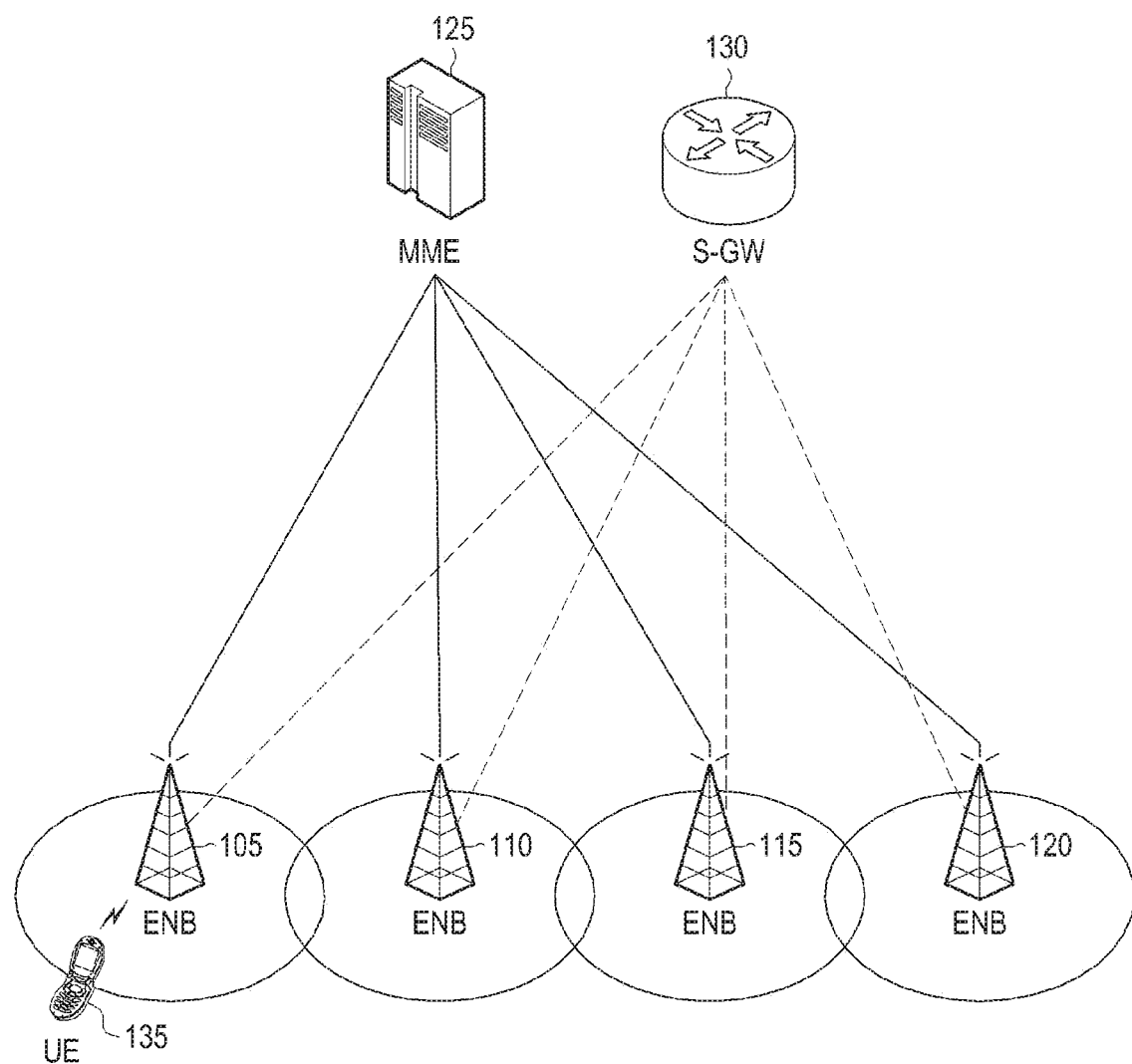
FIG. 1 illustrates a structure of an LTE system.
Figure 2:
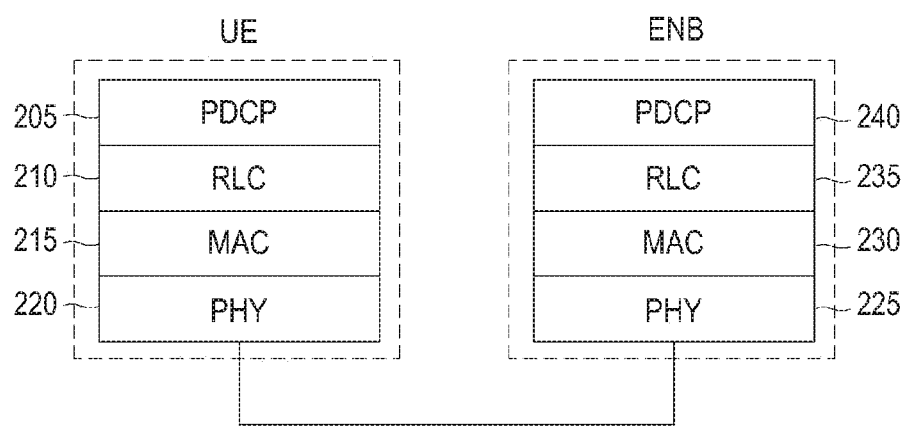
FIG. 2 illustrates a wireless protocol structure in an LTE system.
Figure 3:
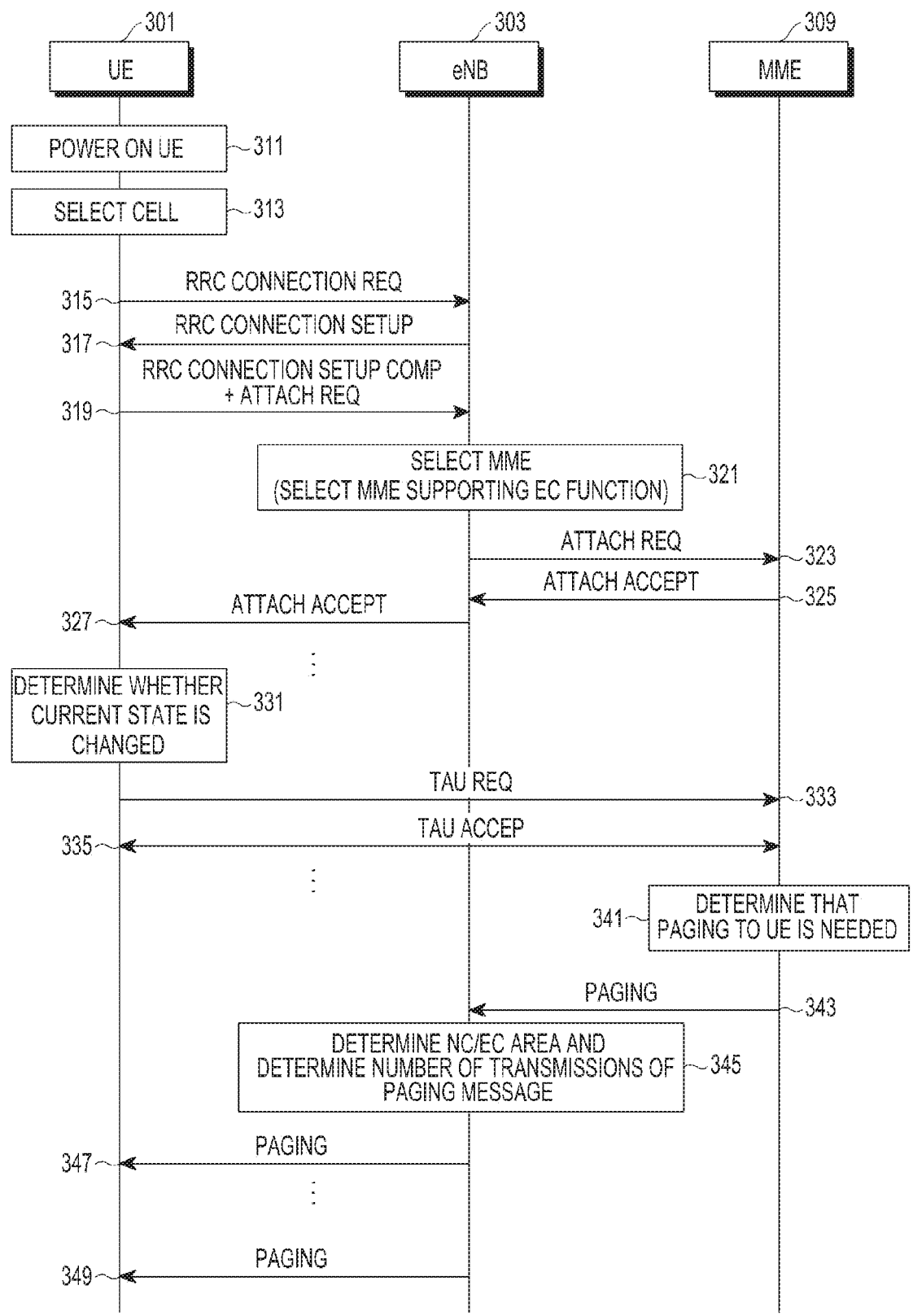
FIG. 3 is a flowchart illustrating a method for receiving a paging message when an MTC UE operates in a CE mode in a wireless communication system according to an embodiment of the present disclosure.

FIG. 3 is a flowchart illustrating a method for receiving a paging message when a machine-type communication (MTC) user equipment (UE) operates in a coverage extension (CE) mode in a wireless communication system according to an embodiment of the present disclosure. In an example of FIG. 3, it is assumed that a UE 301 is an MTC UE.

Referring to FIG. 3, the UE 301 is powered on in operation 311 and performs signal discovery with respect to a neighboring cell to select an eNB (or a cell) 303 in operation 313. The UE 301 determines whether the UE 301 is within a normal coverage (NC) or an extended coverage (EC) based on a received signal strength or a procedure for repeatedly receiving data transmitted from a cell.

Thereafter, to inform a network that the UE 301 is currently in a state where the UE 301 is powered on and is capable of receiving a phone call, the UE 301 sends an RRC connection request message, which is one of control messages of a radio resource control (RRC) layer, to the eNB 303 in operation 315. In this case, according to an embodiment of the present disclosure, the RRC connection request message sent by the UE 301 includes EC function support information and/or NC/EC area indication information. The EC function support information indicates whether the UE supports an EC function, and the NC/EC area indication information indicates whether the UE 301 is within an NC or an EC. In the current embodiment, the EC function support information and/or the NC/EC area indication information are illustrated as being transmitted in operation 315, but may also be transmitted in operation 319 to be described below in another embodiment. In operation 317, the eNB 303 having received the RRC connection request message sends an RRC connection setup message to the UE 301.

In operation 319, the UE 301 sends, to the eNB 303, an RRC connection setup complete message indicating that the RRC connection setup message has been successfully received. The UE 301 may send an attach request message informing the network of location registration through the RRC connection setup complete message. The attach request message is destined from the UE 301 to another network entity which is not the eNB 303, and the eNB 303 receives the attach request message and delivers the attach request message to the another network entity. In the current embodiment, the another network entity is assumed to be the MME 309.

In an embodiment of the present disclosure, the attach request message included in the RRC connection setup complete message sent by the UE 301 may include at least one of the EC function support information and the NC/EC area indication information, together with an ID of the UE 301. If the UE 301 operates within the EC, for repeated reception, at least one of wireless channel state information of the UE 301 in the EC and repeated transmission number information for a paging message, desired by the UE 301, in the EC may be further included in the attach request message.

The eNB 303 having received the RRC connection setup complete message including the attach request message selects, in operation 321, the MME 309 that supports the EC function from among a plurality of MMEs, which are network entities in charge of mobility management of the UE 301, based on information received through the RRC connection request message in operation 315 or information received through the RRC connection setup complete message in operation 319, and delivers the attach request message received through the RRC connection setup complete message to the MME 309 in operation 323. The MME 309 obtains at least one of the EC function support information and the NC/EC area indication information, together with the ID of the UE 301, from the attach request message, and may further obtain at least one of the wireless channel state information and the repeated transmission number information for the paging message.

The MME 309 having received the attach request message sends, to the eNB 303, an attach accept message informing the UE 301 that the attach request message has been successfully received in operation 325, and the eNB 303 delivers the attach accept message to the UE 301 in operation 327. The UE 301 then recognizes that the attach request has been successfully completed (accepted).

Meanwhile, the UE 301 may move within one BS or to another BS, and along with the movement, may move from the EC to the NC or reversely, and may also move from a poor signal strength place to a better signal strength place or from a good signal strength place to a very poor signal strength place within the EC. In this case, in operation 331, the UE 301 determines that a previous state reported to the network through the attach request message, i.e., information about whether the UE 301 is within the NC or the EC, the number of repeated transmissions of the paging message, etc., is different from the current state. The UE 301 then reports the changed current state to the network.

More specifically, to report the changed current state in operation 331, the UE 301 informs the MME 309 that the current state of the UE 301 is different from the previously reported state, by using a tracking area update (TAU) request message in operation 333. The UE 301 transmits at least one of the EC function support information and the NC/EC area indication information, together with the ID of the UE 301, through the TAU request message, like the attach request message, and may further transmit at least one of the wireless channel state information and the repeated transmission number information for the paging message through the TAU request message. The MME 309 having received the TAU request message updates the current UE state, and sends, to the UE 301, a TAU accept message indicating that the TAU request message has been successfully received in operation 335. The UE 301 then recognizes that the TAU request reflecting the current state has been made successfully.

In operation 341, once being notified by a network entity such as the S-GW that data to be transmitted to the UE 301 has arrived, the MME 309 determines that transmission of a paging message is needed to inform the UE 301 of existence of data to be received. In operation 343, the MME 309 sends a paging message to one eNB or a plurality of eNBs in which the UE 301 is currently located, based on the latest UE state received in operation 323 or 333. The latest UE state information received in operation 323 or 333 is transmitted through the paging message. The latest UE state information includes at least one of the EC function support information and the NC/EC area indication information, together with the ID of the UE 301 and may further include at least one of the wireless channel state information and the repeated transmission number information for the paging message.

Figure 4:
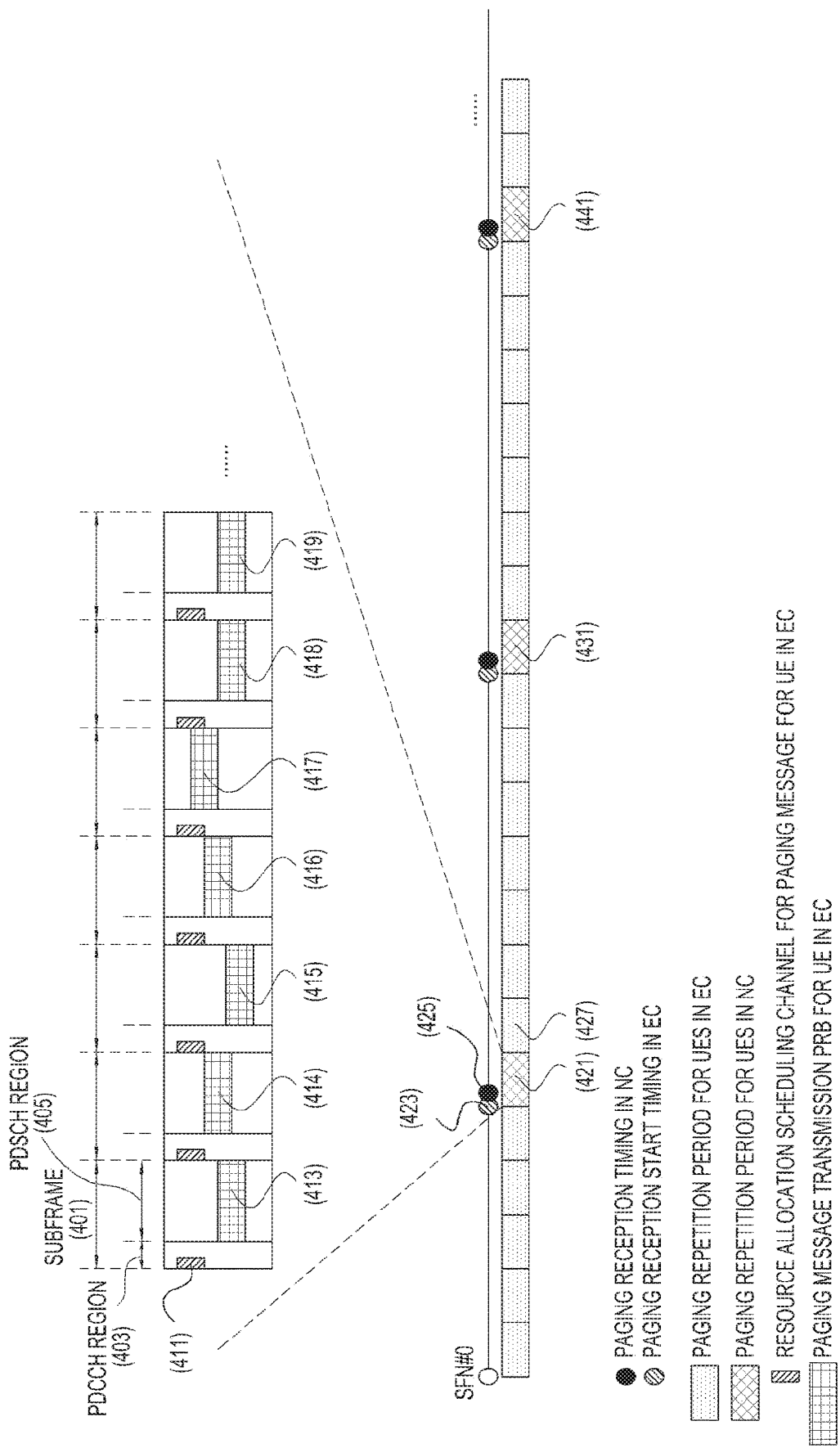
FIG. 4 is a flowchart illustrating a method for receiving a paging message when an MTC UE operates in an EC mode in a wireless communication system according to an embodiment of the present disclosure.

The eNB 303 having received the paging message including the latest UE state information of the UE 301 determines whether to send the paging message to be sent to the UE 301 together with a paging message to be sent to a normal UE or to repeatedly transmit the paging message to be sent to the UE 301 in the CE mode (or the EC mode) operating in the EC in operation 345, determines the number of transmissions of the paging message in case of repeated transmission in the CE mode, and sends the paging message indicating existence of DL data to the UE 301 in operations 347 and 349. If the paging message is repeatedly sent in the CE mode, the eNB 303 separately calculates a time to send the paging message and sends the paging message using a separate method. With reference to FIG. 4, a description will now be made of a detailed method for repeatedly transmitting a paging message in a CE mode.

By using the method proposed in an embodiment of FIG. 4, the MTC UE operating in the CE mode informs the network of the current operation state and separately receives the paging message, minimizing an influence of an existing UE and receiving the paging message even in the EC.

FIG. 4 is a flowchart illustrating a method for receiving a paging message when an MTC UE operates in an EC mode in a wireless communication system according to an embodiment of the present disclosure.

Like in the embodiment of FIG. 3, in FIG. 4, when the eNB sends a paging message to the UE, the eNB sends the paging message in a particular subframe (for example, in the unit of 1 ms, one frame includes 10 subframes, and each subframe has a value of 0 through 9) in a particular system frame (for example, in the unit of 10 ms, every frame has a system frame number which is increased 1 by 1, and each frame has a value of 0 through 1023) 421. In a system in which existing normal UEs receive a paging message, a paging frame (PF) and a paging subframe are determined using a scheme described in Table 1. In Table 1, a paging occasion (PO) means the paging subframe.

TABLE 1

PF: SFN mod T = (T div N)*(UE_ID mod N)
PO: i_s = floor(UE_ID/N) mod Ns
SFN indicates a system frame number.
T indicates a paging period, notified by an eNB to a UE.
N indicates a minimum value between T and nB; that is, min(T, nB)
nB is one of 4T, 2T, T, T/2, T/4, T/8,
T/16, T/32, notified by an eNB to a UE.
UE_ID is determined by an international mobile
subscriber identity (IMSI) uniquely assigned to
each UE by a common carrier; IMSI mod 1024
Ns indicates a maximum value between 1 and nB/T; that is, max(1, nB/T)
A frame in which paging is transmitted is transmitted
in a system frame number satisfying the PF equation.
According to the Ns value and the i_s value, an actually
transmitted subframe index is determined as below.

| Ns | PO when i_s = 0 | PO when i_s = 1 | PO when i_s = 2 | PO when i_s = 3 |
|---|---|---|---|---|
| ° FDD | | | | |
| 1 | 9 | N/A | N/A | N/A |
| 2 | 4 | 9 | N/A | N/A |
| 4 | 0 | 4 | 5 | 9 |
| ° TDD | | | | |
| 1 | 0 | N/A | N/A | N/A |
| 2 | 0 | 5 | N/A | N/A |
| 4 | 0 | 1 | 5 | 6 |

In FIG. 4, when the UE is within the NC, a paging reception timing may refer to PF or PO, for example, in the 3GPP TS36.304 standard. In the current embodiment, when the UE is in the EC, a paging start timing may be set to a start timing of a paging repeated period that is closet to a paging reception timing in the NC.

The eNB sends a paging message to normal UEs in a particular subframe in a particular frame calculated based on Table 1. In an LTE system, when the eNB transmits data to the UE, the eNB sends a resource allocation message 411 in a physical downlink control channel (PDCCH) 403 in a subframe 401 to be transmitted by the eNB, and the resource allocation message 411 includes a location of a resource in which actual data 413 is to be actually transmitted. As indicated by the resource allocation message, the actual data 413 is transmitted in a physical downlink shared channel (PDSCH) 405.

Meanwhile, like in the embodiment of the present disclosure, if the MTC UE operates in the EC mode, an additional transmission method such as repeated transmission needs to be used, and a sufficient time gap is required between transmission periods of paging messages for repeated transmission as needed. To this end, in an embodiment of the present disclosure, two methods for repeated transmission of a paging message are proposed.

The first method is applicable when a paging message may be sufficiently transmitted repeatedly using the method based on Table 1. In the first method, the eNB separately notifies the UE of a time to repeatedly send a paging message (or to repeatedly transmit every DL data) (for example, repeated transmission of every DL data starts from every subframe #0) as indicated by 413, and starts paging message transmission at a repeated transmission time (before or after a frame and a subframe in which the existing paging is received) that is closest to a frame and a subframe in which the paging message is received, according to the method based on Table 1. Referring to FIG. 4, assuming that the subframe in which the paging message is received is a fourth subframe 417 of a frame 421 according to the method based on Table 1, the eNB may send a paging message from a $0^{th}$ subframe 413 of the frame 421 or from a $0^{th}$ subframe of a frame 427 according to the current embodiment. Thereafter, the eNB may repeatedly transmit the paging message in every frame (including a frame 427) before transmission of a next paging message 431.

The second method for repeated transmission of the paging message is applicable when the paging message may not be sufficiently transmitted repeatedly using the method based on Table 1. In this case, a new paging period having a long period is needed, and to this end, the current maximum period of 2.56 seconds may be increased (e.g., to 5.12 seconds), or a method other than the method based on Table 1 may be used, or an SFN value included in the method based on Table 1 may be extended to calculate PF or PO. To extend an SFN value included in the method based on Table 1, the eNB may transmit a new frame number that extends 10-bit SFN information (10 bits are 1024 frames, one frame is 10 ms, and thus a total of 10.24 seconds) having a maximum length of 10.24 seconds, and when the extended frame number and the extended paging interval are used, paging transmission frame and subframe may be determined using Equation of Table 2.

TABLE 2

PF: Extended SFN mod Extended T = (Extended T div N) * (UE_ID mod N)
PO: i_s = floor(UE_ID/N) mod Ns Information about a method for the eNB to repeatedly transmit a paging message (that is, paging repetition period information for the UE in the EC) may be configured by the eNB and informed to the UE by being notified as system information in a cell, or may be previously specified in a related standard to allow the MTC UE operating in the CE mode to use a fixed resource location. That is, a resource allocation/scheduling channel for a paging message for the UE in the EC may be determined as a fixed or limited set of a PDCCH. If repeated transmission is performed in a PDSCH resource location in which repeated transmission is fixed by notification in the cell or using the method according to the related standard, the eNB may directly send paging messages 413, 414, 415, 416, 417, 418, and 419 without a resource allocation message 411 in the PDCCH transmission.

The paging message sent to the MTC UE operating in the CE mode may be sent using an ID that is different from with an existing paging message. For example, a normal paging message may be sent including a paging radio network temporary identifier (P-RNTI) when the resource allocation message 411 is sent, and the UE desiring to receive the paging message may determine whether the P-RNTI is included in the resource allocation message 411 to determine whether the resource allocation message 411 is intended for paging message transmission.

In an embodiment of the present disclosure, a method is proposed in which a coverage enhancement RNTI (CE-RNTI) instead of the P-RNTI is introduced, such that if the eNB uses a resource allocation message when sending a paging message for MTC UEs operating in the CE mode, the resource allocation message is sent including the CE-RNTI. Thus, the MTC UEs operating in the CE mode may receive the paging message after determining whether the resource allocation message includes the CE-RNTI. In this case, cyclic redundancy check masking is performed using the CE-RNTI in place of the P-RNTI.

In another embodiment, the paging message may be received regardless of whether the UE is in the NC or the EC, without separating the operating of receiving the paging message based on whether the UE is in the NC or the EC.

Figure 5:
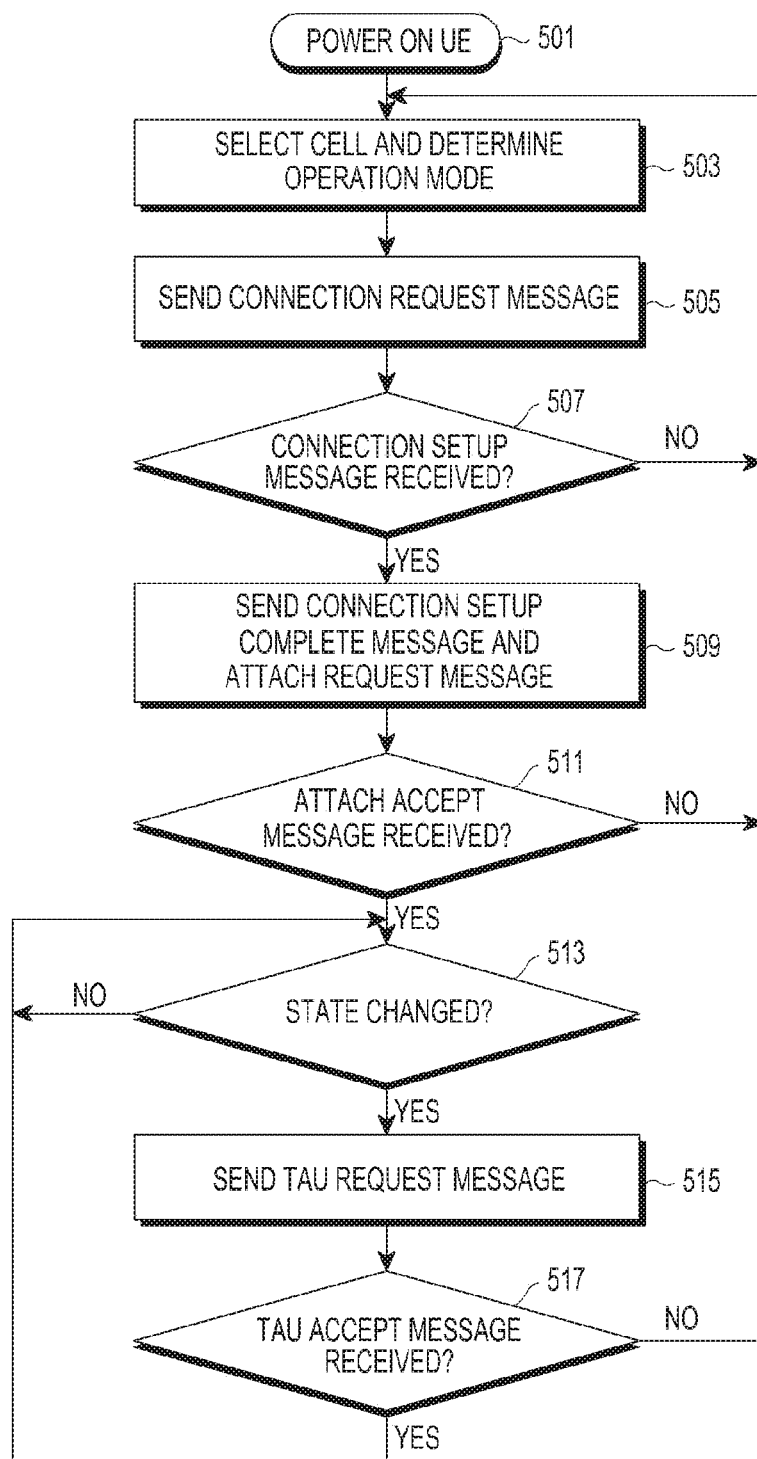
FIG. 5 is a flowchart illustrating a procedure for updating state information at an MTC UE in a wireless communication system according to an embodiment of the present disclosure.

FIG. 5 is a flowchart illustrating a procedure for updating state information at an MTC UE in a wireless communication system according to an embodiment of the present disclosure. The procedure illustrated in FIG. 5 shows operations in light of the UE in the embodiment of FIG. 3. Referring to FIG. 5, the UE 301 is powered on in operation 501 and searches for a signal of a neighboring cell and selects an eNB (or a cell) in operation 503. At this time, the UE determines whether the UE is within an NC or an EC based on a received signal strength or a procedure for repeatedly receiving data transmitted from a cell.

In operation 505, the UE sends an RRC connection request message to the eNB to inform the network that the UE is currently in the state where the UE is powered on and is capable of receiving a phone call. In an embodiment of the present disclosure, the UE may inform the eNB of whether the UE supports the EC function or whether the UE is within the NC or the EC.

If the UE receives the RRC connection setup message from the eNB in operation 507, the UE sends, to the eNB, the RRC connection setup complete message indicating that the RRC connection setup message has been successfully received, in operation 509. The UE may send the attach request message informing the network of location registration through the RRC connection setup complete message. The attach request message is sent to a network entity such as an MME via the eNB. The attach request message may include at least one of the EC function support information and the NC/EC area indication information, together with the ID of the UE 3, as described in the embodiment of FIG. 3, and may further include at least one of the wireless channel state information and the repeated transmission number information for the paging message if the UE operates in the EC.

Once receiving the attach accept message from the network in operation 511, the UE recognizes that information included in the attach request message has been successfully delivered to the network and determines whether there is a change in the state of the UE previously reported to the network in operation 513. If there is a change in the state information of the UE in operation 513, the UE informs the MME, by using the TAU request message, that the previously reported state is different from the latest reported state. The TAU request message, like the attach request message, may include at least one of the EC function support information and the NC/EC area indication information, together with the ID of the UE 3, and may further include at least one of the wireless channel state information and the repeated transmission number information for the paging message if the UE operates in the EC.

Once receiving the TAU accept message from the network in operation 517, the UE recognizes that information included in the TAU request message has been successfully delivered to the network and continues determining whether there is a change in the state of the UE previously reported to the network.

Figure 6:
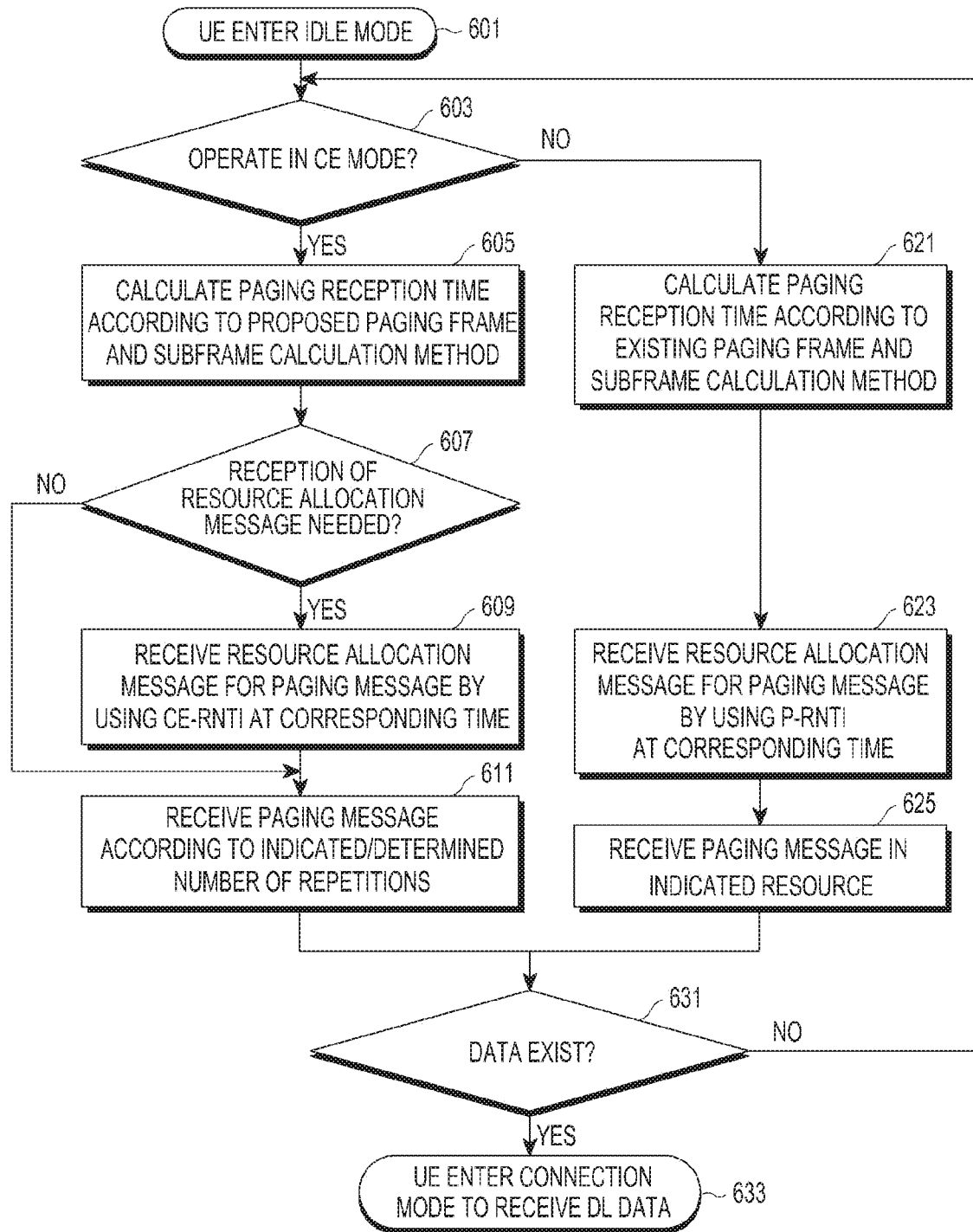
FIG. 6 is a flowchart illustrating a procedure for receiving a paging message at an MTC UE in a wireless communication system according to an embodiment of the present disclosure.

FIG. 6 is a flowchart illustrating a procedure for receiving a paging message at an MTC UE in a wireless communication system according to an embodiment of the present disclosure. The procedure illustrated in FIG. 6 shows operations in light of the UE in the embodiments of FIGS. 3 and 4.

Referring to FIG. 6, in operation 601, the UE switches to an RRC idle state (RRC_IDLE) such as an idle mode, from an RRC connection state (RRC_CONNECTED) where data may be transmitted to or received from the eNB any time. If there is data to be transmitted to the UE in the RRC idle state, the network may transmit the data to the UE only after switching the UE to the RRC connection state by sending the paging message.

Thereafter, in operation 603, the UE determines whether the UE operates in the CE mode. If the UE operates in the CE mode, the UE calculates a paging reception time according to the paging frame and subframe calculation method proposed in Table 2, as described in the embodiment of FIG. 4, in operation 605.

In operation 607, the UE determines at the paging reception time determined based on Table 2 whether reception of a resource allocation message is needed; if the reception is needed, the UE receives the resource allocation message for the paging message by using the CE-RNTI in operation 609 and receives the paging message indicated by the resource allocation message in operation 611.

On the other hand, if the eNB is set to use a resource location notified in the cell or fixed in the standard, the UE receives the paging message in the resource location in operation 611 without separately receiving the resource allocation message in operation 607. If the UE operates in the CE mode, the eNB may transmit the paging message repeatedly several times until the next paging period, such that the UE repeatedly receives the paging message until successful reception, thereby improving the probability of success.

On the other hand, if the UE does not operate in the CE mode in operation 603, the UE calculates a paging reception time according to the existing paging frame and subframe calculation scheme described based on Table 1 in operation 621, receives a resource allocation message for the paging message by using the P-RNTI at the paging reception time in operation 623, and receives the paging message in a resource location indicated through the resource allocation message in operation 625.

If successfully receiving the paging message, the UE determines whether there is data to be transmitted to the UE in operation 631; if there is the data to be transmitted, the UE switches to the RRC connection state to receive DL data in operation 633.

Figure 7:
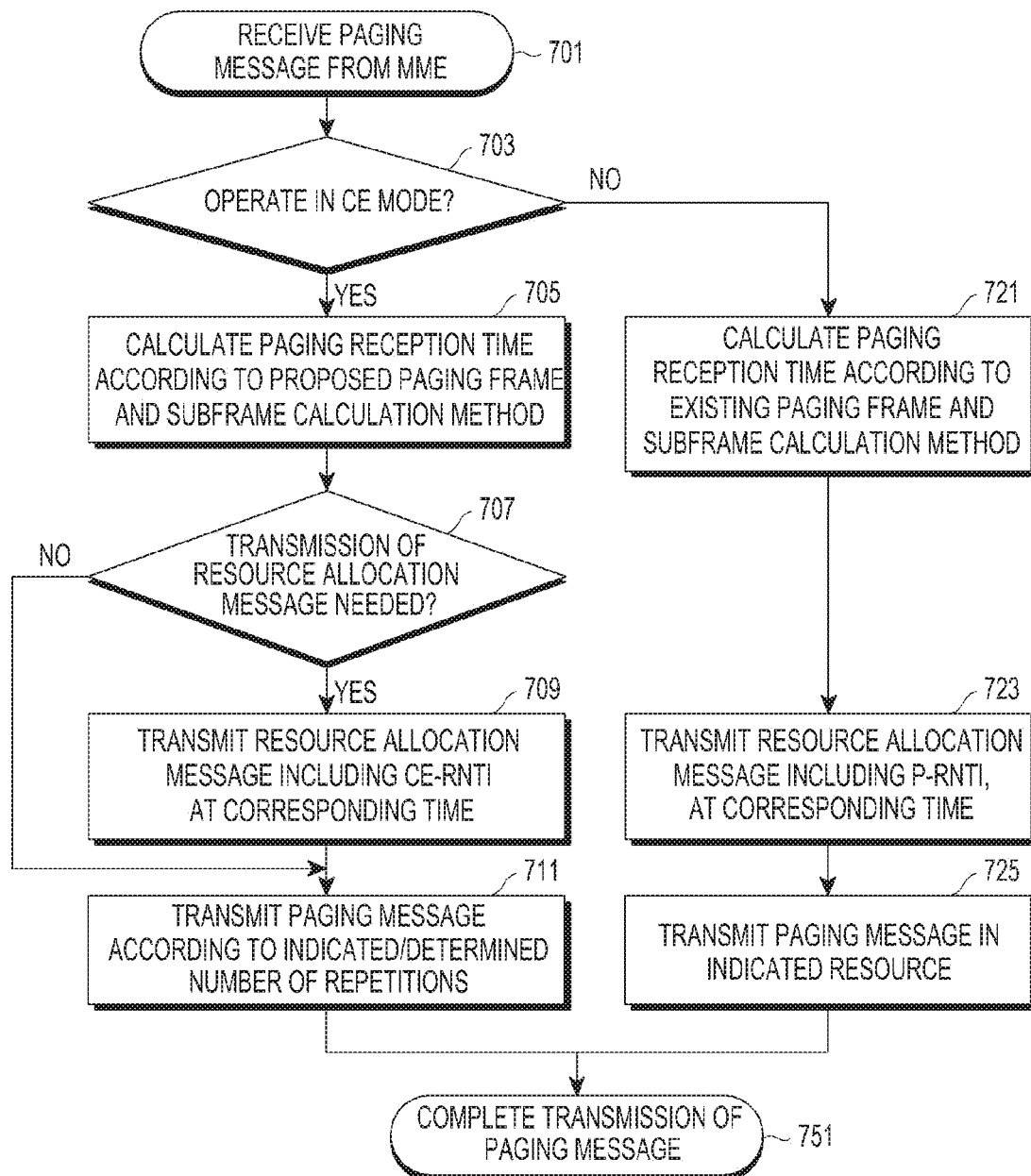
FIG. 7 is a flowchart illustrating a procedure for sending a paging message at a base station in a wireless communication system according to an embodiment of the present disclosure.

FIG. 7 is a flowchart illustrating a procedure for sending a paging message at a base station in a wireless communication system according to an embodiment of the present disclosure. The procedure illustrated in FIG. 7 shows operations in light of the eNB in the embodiments of FIGS. 3 and 4.

Referring to FIG. 7, the eNB receives a paging message from the MME and recognizes that there is data to be transmitted to a particular UE in operation 701. Herein, the paging message may include latest state information of the UE. The state information includes at least one of the EC function support information and the NC/EC area indication information, together with the ID of the UE 301 and may further include at least one of the wireless channel state information and the repeated transmission number information for the paging message. In operation 703, the eNB determines from information in the paging message whether the UE operates in the CE mode; for the UE operating in the CE mode, the eNB sends the paging message using a separate method proposed in the embodiment of FIG. 4.

If the UE to receive the paging message operates in the CE mode in operation 703, a paging reception time is calculated according to the paging frame and subframe calculation method proposed in Table 2, as described in the embodiment of FIG. 4, in operation 705.

In operation 707, the eNB determines at the paging reception time determined based on Table 2 whether transmission of a resource allocation message is needed; if the transmission is needed, the eNB transmits the resource allocation message for the paging message by using the CE-RNTI in operation 709 and transmits the paging message in the resource position indicated by the resource allocation message in operation 711.

On the other hand, if the eNB is set to use a resource location notified in the cell or fixed in the standard, the eNB transmits the paging message with the determined resource in operation 711 without separately transmitting the resource allocation message in operation 707. If the UE operates in the CE mode, the eNB repeatedly transmits the paging message until the next paging period to enable the UE to successfully receive the paging message.

On the other hand, if the UE to receive the paging message does not operate in the CE mode in operation 703, the eNB calculates a paging reception time according to the existing paging frame and subframe calculation scheme described based on Table 1 in operation 721, transmits a resource allocation message for the paging message by using the P-RNTI at the paging reception time in operation 723, and transmits the paging message in the resource location indicated through the resource allocation message in operation 725.

Figure 8:
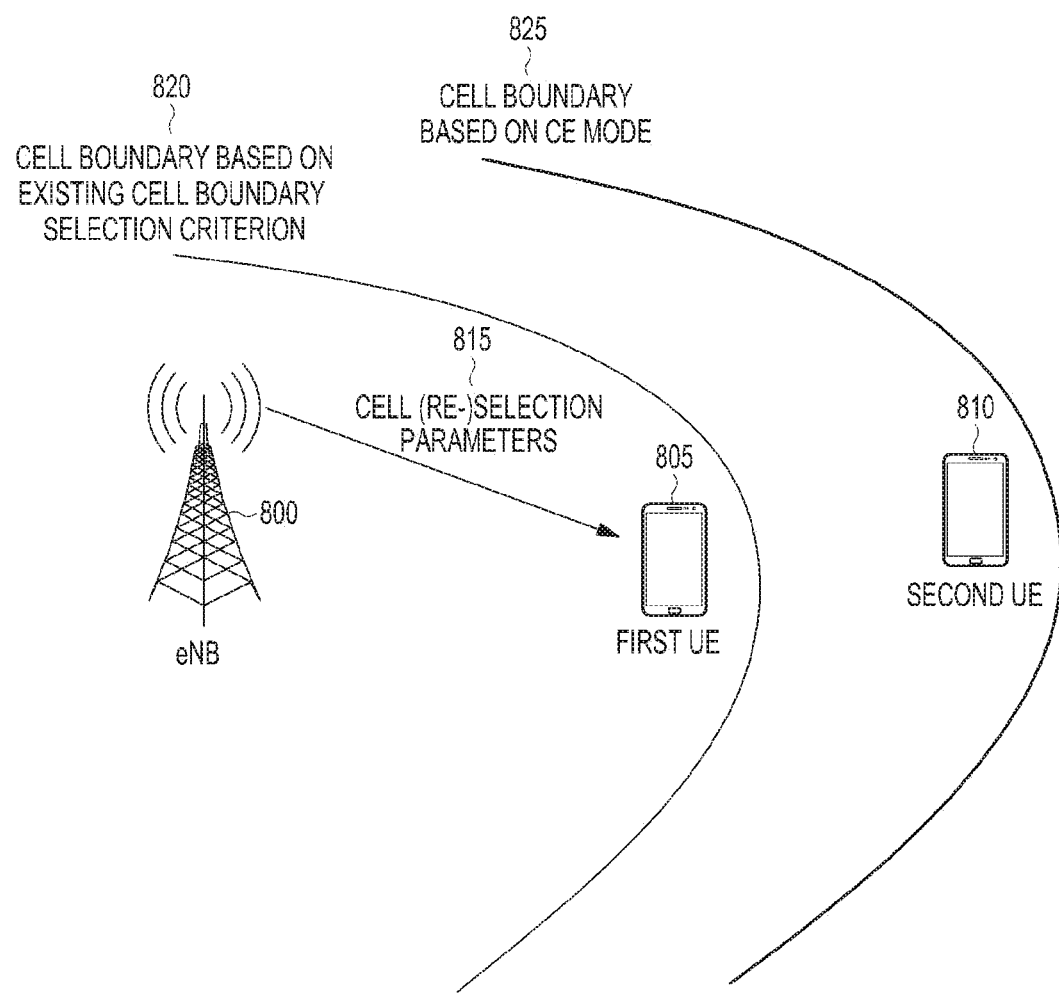
FIG. 8 is a view for describing a service area of an MTC UE in a wireless communication system according to an embodiment of the present disclosure.

FIG. 8 is a view for describing a service area of an MTC UE in a wireless communication system according to an embodiment of the present disclosure.

Referring to FIG. 8, an eNB 800 broadcasts configuration information for cell selection through broadcast information for transmitting system information, i.e., system information block1 (SIB1), as indicated by 815. The UE having received the configuration information determines based on the configuration information whether a received signal strength or quality of a cell satisfies predetermined criteria. If so, the UE determines that cell as a serving cell. This operation is referred to as a cell selection operation. In another way, cell selection may be a criterion for determining a service area of the cell. That is, if the received signal strength or quality of the cell does not satisfy the predetermined criteria, the UE does not regard the cell as the serving cell and may search for another serving cell.

Hereinbelow, a cell selection operation of the UE will be described in more detail. In order for the UE to determine the particular cell as the serving cell, the following equations should be satisfied in view of signal strength and quality.

$$\text{Srxlev} > 0 \text{ and } \text{Squal} > 0, \quad \text{[Equation 1]}$$

where Srxlev and Squal are defined as in Equation 2 and Equation 3, and are referred to as S-criteria.

$$\text{Srxlev} = q\text{-Rxlevmeas} - (q\text{-Rxlevmin} + q\text{-Rxlevminoffset}) - P\text{compensation} \quad \text{[Equation 2]}$$

$$\text{Squal} = q\text{-Qualmeas} - (q\text{-Qualmin} + q\text{-Qualminoffset}) \quad \text{[Equation 3]}$$

Definitions of parameters related to Equation 1 through Equation 3 are provided in Table 3. The LTE standard document TS36.304 describes related information in detail. q-Rxlevmin, q-Qualmin, q-Rxlevminoffset, q-Qualminoffset, and PEMAX are included in the SIB 1.

TABLE 3

| | |
|---|---|
| Srxlev | Cell selection RX level value(dB) |
| Squal | Cell selection quality values(dB) |
| q-Rxlevmeas | Measured cell RX level value(RSRP) |
| q-Qualmeas | Measured cell quality value(RSRQ) |
| q-Rxlevmin | Minimum required RX level in the cell(dBm) |
| q-Qualmin | Minimum required quality level in the cell(dB) |
| q-Rxlevminoffset | Offset to the signalled Qrxlevmin taken into account in the Srxlev evaluation as a result of a periodic search for a higher priority PLMN while camped normally in a VPLMN |
| q-Qualminoffset | Offset to the signalled Qqualmin taken into account in the Squal evaluation as a result of a periodic search for a higher priority PLMN while camped normally in a VPLMN |
| Pcompensation | $\max(P_{EMAX} - P_{PowerClass}, 0)$(dB) |

According to the S-Criteria, it can be seen that a cell may be determined as a serving cell if a received signal strength q-Rxlevmeas and a signal quality q-Qualmeas of the UE for the cell exceed predetermined threshold values. In order for a particular cell to be a suitable cell capable of being provided with a general service, several additional conditions as well as Equation 1 through Equation 3 should be satisfied together. For example, a public land mobile network (PLMN) the cell may support should be identical to a selected PLMN, a registered PLMN, or equivalent PLMNs of the UE. Moreover, access prohibit for the cell should not have been set, and the cell should not be included in the "forbidden tracking areas for roaming" list. If all the aforementioned conditions are satisfied, the cell may be the suitable cell for the UE.

Referring back to the description of FIG. 8, two MTC UEs (e.g., a first UE 805 and a second UE 810) that are spaced apart from a periphery of an eNB 800 by a predetermined distance are assumed. The first UE 805 is located close to the eNB 800 and performs an existing cell selection operation to connect to the eNB 800 as the serving cell. Reference numeral 820 indicates a cell boundary determined based on an existing cell boundary selection criterion. However, the second UE 810 is located farther from the eNB 800, such that when the second UE 810 performs the existing cell selection operation, the second UE 810 may not be connected to the eNB 810 as the serving cell. This phenomenon may occur when the second UE 810 is located far from the eNB 800 or may be in a poor communication environment such as a subway, a warehouse, etc., and may also occur if the performance of the receiver of the second UE 810 is very poor. In other words, although the actual cell is arranged to provide a service to an area where the second UE 810 is located, the second UE 810 may not be connected to the eNB 800 due to the poor performance of the second UE 810. This is because the MTC UE may have to be produced at a lower cost than the normal UE, and for this end, the MTC UE may adopt a poor-performance receiver. However, in spite of such restrictions, the second UE 810 has to be connected to the eNB 800. To this end, a new approach is required. In an embodiment of the present disclosure, a method for extending a service coverage, taking the MTC UE into account is proposed. Reference numeral 825 indicates an extended service area of the second UE 810 operating in the CE mode, i.e., a cell boundary based on the CE mode.

Figure 9:
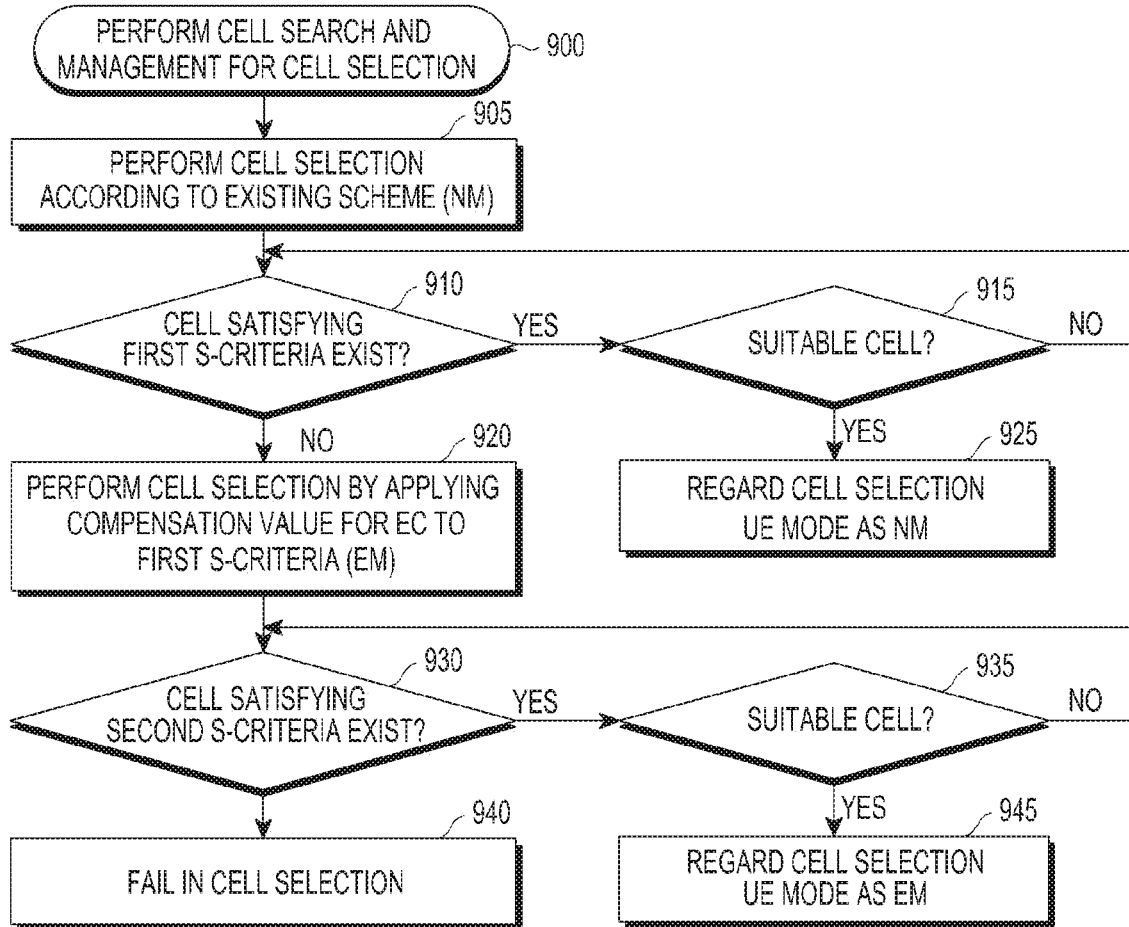
FIG. 9 illustrates a cell selection operation of an MTC UE in a wireless communication system according to an embodiment of the present disclosure.

FIG. 9 illustrates a cell selection operation of an MTC UE in a wireless communication system according to an embodiment of the present disclosure.

In the current embodiment, as an operation mode of the UE for cell selection, a normal mode (NM) to search for a suitable cell through an existing cell selection operation and an extended coverage mode (EM) to search for a suitable cell through a cell selection operation for the MTC UE are proposed. In the current embodiment, the existing cell selection scheme is improved so that even the MTC UE located far from the eNB or having poor receiver performance may be connected to the eNB. The improved cell selection scheme may be used, but it would be more desirable to find a suitable cell through the existing cell selection operation if possible. This is because providing of a sufficiently high quality service to the MTC UE is guaranteed. If the UE finds the eNB through the improved cell selection scheme, the UE may comp on the eNB even in a poor channel state, but in the EM, the UE may be provided with a degraded-quality service such as permission of more re-transmissions. Thus, in the current embodiment, even the MTC UE operates in the ME after performing the existing cell selection operation, instead of directly operating in the EM. The MTC UE may operate in the EM if a particular condition is satisfied.

Referring to FIG. 9, in operation 900, the MTC UE (hereinafter, the UE) performs cell discovery and neighboring cell measurement for cell selection. In operation 905, the UE performs cell selection by using the S-Criteria of Equation 1 through Equation 3. The necessary configuration information includes information included in the SIB 1 broadcast from the eNB. In operation 910, the UE determines whether the S-Criteria (i.e., first S-Criteria) are satisfied. In another embodiment, to determine whether the S-Criteria are satisfied, methods other than using Equation 1 through Equation 3 may be considered. For example, if the UE succeeds in receiving and decoding, e.g., master information block (MIB) and/or SIB 1 in an LTE system, broadcast from the cell, the UE may regard the S-Criteria as being satisfied. In an existing LTE technology, if the UE fails in receiving MIB or SIB 1 from a particular cell by expiry of a T331 timer, the UE regards the cell as a 'barred cell' in cell selection. However, in the current embodiment, even if the UE fails in receiving MIB or SIB 1 in spite of the elapse of a particular time, the cell is not immediately regarded as the 'barred cell', and instead, is regarded as the 'barred cell' if failing to receive the MIB or the SIB 1 from a cell to be connected to the aforementioned EM.

If the S-Criteria are satisfied in operation 910, the UE determines whether the above-described cell condition is satisfied in operation 915. Unless the above-described cell condition is satisfied, the UE continuously searches for a cell that satisfies the S-Criteria from among other neighboring cells. If the suitable cell condition is satisfied, the UE is camped on the cell, performs cell selection in the NM, and regards the suitable cell as being found in operation 925. Meanwhile, if the S-Criteria are not satisfied using the existing cell selection scheme in operation 910, the UE applies a particular compensation value to the existing S-Criteria and performs cell selection again in operation 920. A method for applying the particular compensation value will be described in detail. In operation 930, the UE determines whether the improved S-Criteria (i.e., second S-Criteria) are satisfied. If so, the UE determines whether the cell satisfies a suitable cell condition in operation 935. If the suitable cell condition is also satisfied, the UE selects the cell in the EM and regards the suitable cell as being found in operation 945. If the S-Criteria are not satisfied in operation 930, the UE regards cell selection as failing in operation 940. If the embodiment of FIG. 9 is applied, the UE is camped on one suitable cell and regards the current state as the NM or the EM according to a re-selection scheme. The UE may be affected in its subsequent operations according to whether the current state is the NM or the EM.

To be more specific with respect to operation 920 of FIG. 9, in the current embodiment, three cell selection methods for applying a particular compensation value to the existing S-Criteria are proposed as below.

The first cell selection method is to fixedly add a particular value α to the existing S-Criteria equation as expressed below.

$$\text{Srxlev}+\alpha>0 \text{ and Squal}+\alpha>0 \quad \text{[Equation 4]}$$

Application of the particular value a satisfies the S-Criteria even if the received signal strength or quality of the UE is degraded by the particular value α. For example, the particular value α may be set to 15 dB, and to another particular value that is experimentally obtained.

The second cell selection method is to separately define parameters applied for calculation of the S-Criteria.

More specifically, in the CE mode corresponding to q-Rxlevmin and q-Qualmin, new values q-RxlevminCE and q-QualminCE are set. That is, the UE calculates the S-Criteria by using the newly defined values q-RxlevminCE and q-QualminCE in place of the existing values q-Rxlevmin and q-Qualmin In the current embodiment, if Srxlev and Squal based on q-Rxlevmin and q-Qualmin are satisfied, the UE regards the current mode as the NM, or if Srxlev and Squal based on newly defined q-RxlevminCE and q-QualminCE are satisfied, the current mode is regarded as the EM. The newly defined values are provided from the eNB like the existing values.

The third cell selection method is to define new parameters that are irrelevant to existing parameters. These parameters may be applied together with existing parameters, instead of being applied in place of the existing parameters. That is, in Equation 5, like q-RxlevoffsetCE and q-QualoffsetCE, new parameters are added to the existing S-Criteria. The two new parameters may also be provided from the eNB.

$$\text{Srxlev}=q\text{-Rxlevmeas}-(q\text{-Rxlevmin}+q\text{-Rxlevminoffset})-P\text{compensation}+q\text{-RxlevoffsetCE}$$

$$\text{Squal}=q\text{-Qualmeas}-(q\text{-Qualmin}+q\text{-Qualminoffset})+q\text{-QualoffsetCE} \quad \text{[Equation 5]}$$

If the UE fails to satisfy the existing S-Criteria, but satisfies Equation 5, then the UE regards the current mode as the EM.

The moving UE makes an effort to find a more suitable serving cell. This operation is referred to as cell re-selection. The cell re-selection method is performed based on received signal strength and frequency of the serving cell and a neighboring cell and priority information between RATs. The priority information is broadcast by the eNB through, e.g., SIB 3, and the priority information dedicatedly applied to each UE may be provided using an RRC connection release message. Even in the cell re-selection method, the UE needs a new rule according to the NM or the EM. Generally, if the UE in the EM is switchable to the NM, it may be desirable for the UE to switch to the NM. Thus, there is a need to process existing priority information. Prior to a detailed description of the current embodiment, an existing cell re-selection method will be described first.

Figure 10:
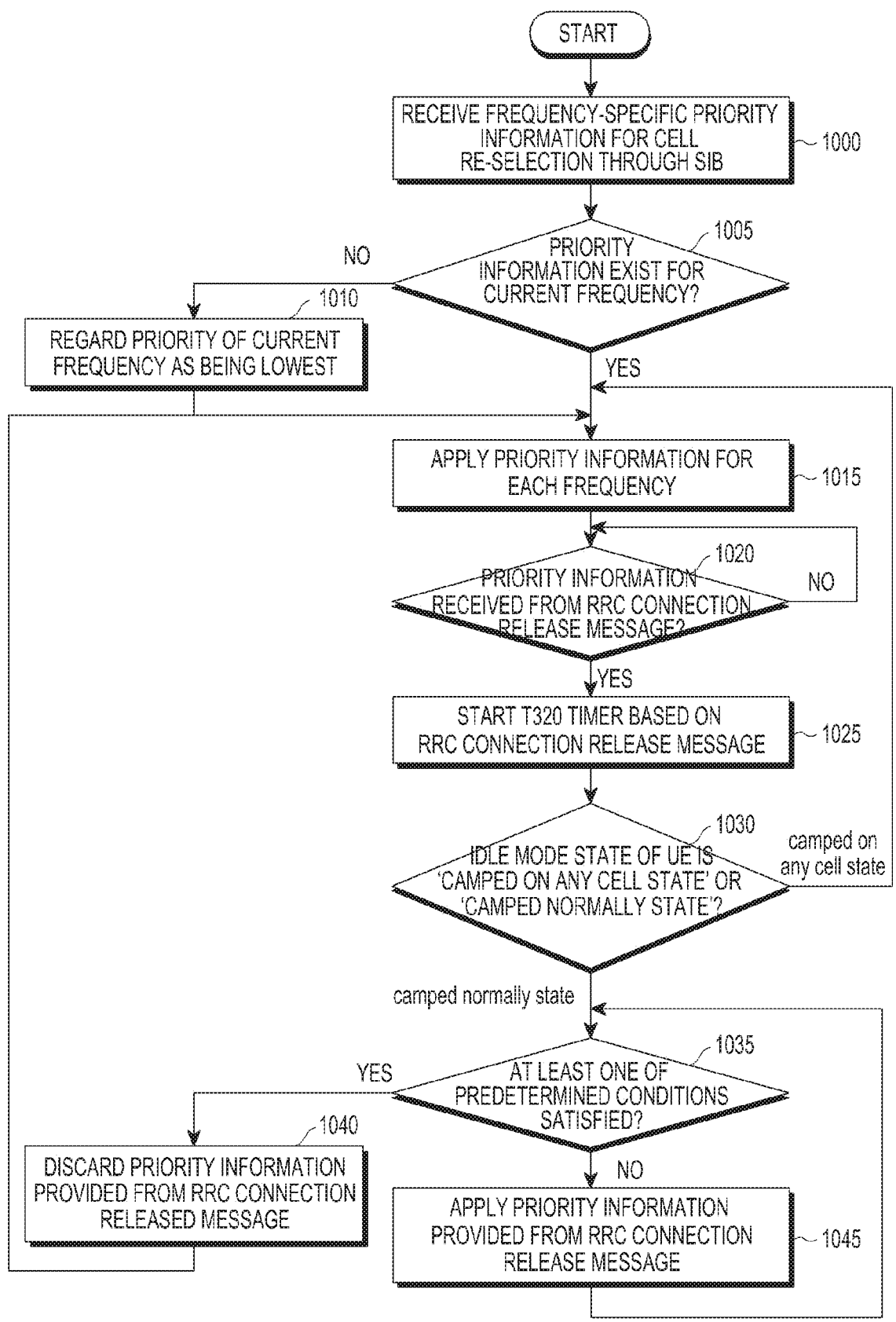
FIG. 10 is a flowchart illustrating a method for providing frequency-specific priority information for cell re-selection to a UE in a wireless communication system according to an embodiment of the present disclosure.

FIG. 10 is a flowchart illustrating a method for providing frequency-specific priority information for cell re-selection to a UE in a wireless communication system according to an embodiment of the present disclosure.

Cell re-selection may be understood as a process of re-selecting a serving cell to allow the moving UE to connect to a cell having the best channel state. The network gives priority to each frequency to control cell re-selection by UEs in an idle state. For example, one UE receives priority information for two frequencies f1 and f2 from the eNB, and if f1 has a higher priority than f2, the UE is highly likely to stay at f1. Also, even if the UE is at f2, if a channel state of f2 is not good, the UE may attempt to move to f1. In the current embodiment, frequency-specific priority information is broadcast through SIB or provided to a particular UE through an RRC connection release message, which is dedicated RRC signaling. If the UE is provided with UE-specific priority information through RRC signaling even though having received priority information regarding frequencies, then the priority information received from the SIB may be ignored. The priority information of each frequency is delivered from the eNB through a cellReselectionPriority information element (IE), and is given, for example, one of 8-level priorities. Frequencies between radio access technologies (RATs) may not be given an identical priority. If the idle state of the UE is a 'camped on any cell state', then frequency priority information given through the SIB is applied and priority information given through RRC signaling is stored without being used. The cellReselectionPriority IE is an optional IE, and may not exist. In this case, priority information regarding a frequency may not be given. The UE then regards the priority of the frequency as the lowest-level priority.

Referring to FIG. 10, the UE is provided with priority information regarding frequencies used in other RATs as well as evolved universal terrestrial radio access (EUTRA), through the SIB, in operation 1000. However, priority information for every frequency is not necessarily provided. The priority information for a frequency of the currently camped serving cell may not be provided, either. The UE determines whether priority information exists for the current frequency in operation 1005. If the priority information for the frequency of the current serving cell is not provided, the UE regards the priority of the frequency of the current serving cell as the lowest-level priority. The UE applies priority information of respective frequencies in operation 1015. The UE switches from a connected mode to an idle mode, if receiving the RRC connection release message from the eNB. The RRC connection release message may include priority information of a frequency. This information is UE-specific information, and is applied preferentially over frequency priority information provided through SIB. Thus, the UE determines whether frequency priority information is included in the RRC connection release message in operation 1020. If the frequency priority information is included, a timer T320 value included in the RRC connection release message is applied to drive one timer in operation 1025. The UE determines whether the idle mode state is a 'camped on any cell state' or 'camped normally state' in operation 1030. The 'camped normally state' refers to a state where the UE is camped on the suitable cell. The suitable cell refers to a cell that is capable of providing a normal service to the UE, and satisfies four conditions provided below. In regard to definition of the suitable cell, if a cell desiring to determine whether the cell is the suitable cell is not a CSG cell, the following condition 1) through condition 3) need to be satisfied and condition 4) is applied for the CSG cell:

1) the cell corresponds to the selected PLMN, the registered PLMN, or one PLMN in the equivalent PLMN list;
2) the cell that is not barred;
3) the cell that satisfies cell selection criterion; and
4) for a closed subscriber group (CSG) cell, a cell having a corresponding CSG ID in a whitelist of the UE.

The 'camped on any cell state' refers to a state where the UE is camped on an acceptable cell because of failing to be camped on a suitable cell. A general service may not be provided in the acceptable cell where the UE may merely attempt an emergency call. The acceptable cell satisfies the following two conditions:

1) the cell that is not barred; and
2) the cell that satisfies cell selection criterion.

If the UE is in the 'camped on any cell state' idle state in operation 1030, the UE goes to operation 1015 to apply frequency priority information provided from the SIB instead of the priority information provided through the RRC connection release message. If the UE is in the 'camped normally' idle state in operation 1030, the UE determines whether at least one of the following three conditions is satisfied, in operation 1035. The three conditions are as provided below.

1) the UE switches to the connected mode;
2) the T320 timer has expired; and
3) the PLMN selection process is performed according to a non-access stratum (NAS) request.

If any one of the foregoing three conditions is satisfied, the UE discards the priority information provided through the RRC connection release message and applies the frequency priority information provided from the SIB in operation 1015. Otherwise, if none of the three conditions is satisfied, the UE applies the priority information provided through the RRC connection release message in operation 1045.

The frequency priority information affects measurement of a particular frequency, performed by the UE. For a frequency having a higher priority than a current serving cell, the UE performs measurement at all times. On the other hand, the same intra-frequency as the serving cell or another frequency having the same priority as or a lower priority than the intra-frequency does not perform measurement with respect to the frequency at all times to save the power of the UE. The measurement by the UE is performed when a channel quality of service (QoS) of the serving cell is less than or equal to a particular threshold value. Cell re-selection is performed for movement to a cell having a good channel state, such that there is no reason to move to a frequency having the same priority or a lower priority in spite of a good channel QoS of the current serving cell. Thus, to reduce power consumption caused by unnecessary channel measurement, whether to perform measurement is determined based on a particular threshold value. For the same intra-frequency, if the QoS of the serving cell is the same as or lower than a threshold value $S_{intrasearch}$, channel measurement is performed for other cells having the same frequency. For another frequency having the priority that is the same as or lower than that of the intra-frequency, if the QoS of the serving cell is the same as or lower than a threshold value $S_{nonintrasearch}$, channel measurement is performed for other cells having the another frequency. The channel QoS generally considers reference signal receive power (RSRP) and reference signal received quality (RSRQ).

The UE performs measurement in the foregoing manner, and if the channel QoS of a cell of a high-priority frequency becomes higher than a threshold value $Threshx_{X-high}$, the UE re-selects the cell of the high-priority frequency as the serving cell. If the channel QoS of the cell of the low-priority frequency becomes higher than a threshold value $Thresh_{X-low}$ and the QoS of the serving cell becomes lower than a threshold value $Thresh_{Serving-low}$, then the UE re-selects the cell of the low-priority frequency as the serving cell.

Figure 11:
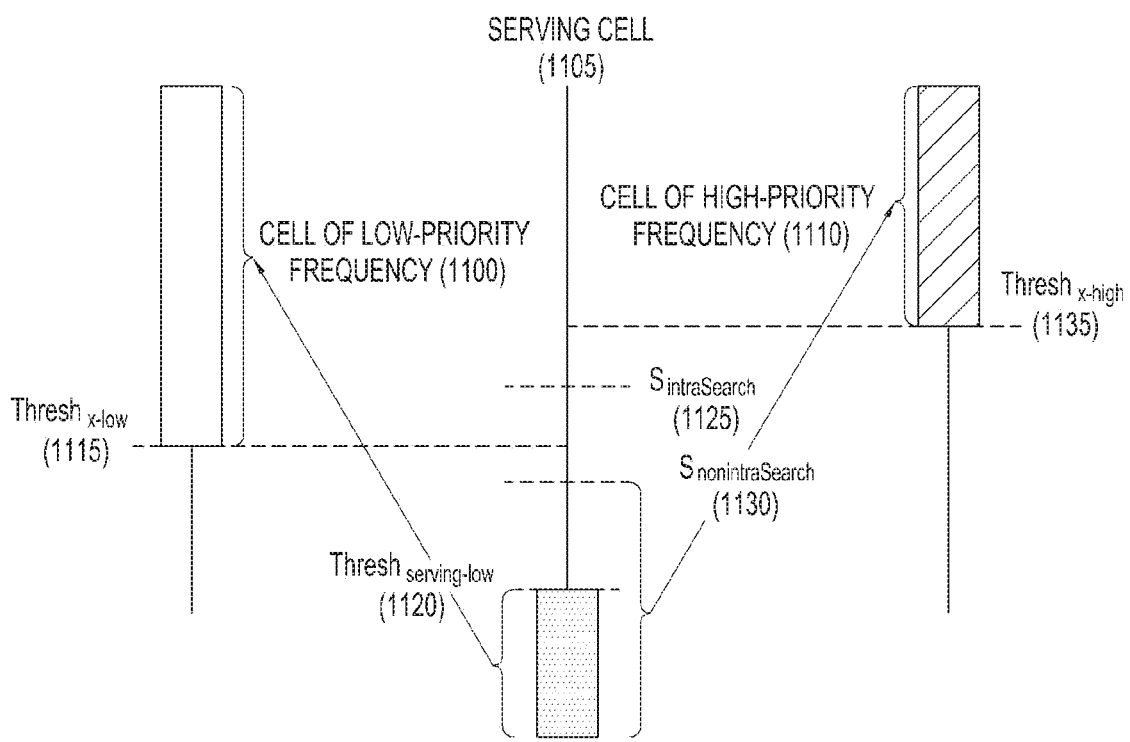
FIG. 11 is a flowchart illustrating a method for performing cell re-selection based on a signal strength at a UE in a wireless communication system according to an embodiment of the present disclosure.

FIG. 11 is a flowchart illustrating a method for performing cell re-selection based on a signal strength at a UE in a wireless communication system according to an embodiment of the present disclosure.

In an example of FIG. 11, multiple (particular) threshold values used for re-selection of the serving cell in the current embodiment are illustrated in the order of magnitude.

The UE performs inter-freq/RAT measurement for a frequency having a high frequency or an RAT at all times, regardless of a measured signal strength for the serving cell. Referring to FIG. 9, if the measured signal strength for the serving cell is lower than a first threshold value $S_{intraSearch}$ 1125, the UE performs intra-freq measurement. If the measured signal strength for the serving cell is lower than a second threshold value $S_{nonintraSearch}$ 1130, the UE performs inter-freq/RAT measurement with respect to a frequency having a priority that is the same as or lower than that of the frequency of the current serving cell. By triggering measurement stepwise by the UE in this way, the power consumption of the UE, caused by measurement with respect to a neighboring cell, may be reduced. If a channel QoS of a cell 1110 of a frequency having a high priority becomes higher than a third threshold value $Thresh_{X-high}$ 1135, the UE re-selects the cell having the high priority as a serving cell. If a channel QoS of a cell 600 of a frequency having a low priority becomes higher than a fourth threshold value $Thresh_{X-low}$ 1115 and a QoS of a serving cell becomes lower than a fifth threshold value $Thresh_{Serving-low}$ 1120, then the UE re-selects the cell having the low priority as the serving cell.

In cell re-selection, the RSRP or the RSRQ may be considered. If the RSRQ is used, the eNB provides to the UE, by broadcasting, $Thresh_{serving-lowQ}$, $Thresh_{X-lowQ}$, and $Thresh_{X-highQ}$ corresponding to $Thresh_{Serving-low}$ 1120, $Thresh_{X-low}$ 1115, and $Thresh_{X-high}$ 1135, respectively. When the RSRP is used, to be distinguished from other parameters, $Thresh_{serving-lowP}$, $Thresh_{X-lowP}$, and $Thresh_{X-highP}$ corresponding to $\text{Thresh}_{Serving-low}$ 1120, $\text{Thresh}_{X-low}$ 1115, and $\text{Thresh}_{X-high}$ 1135, respectively, are used in the embodiment of the present disclosure.

Figure 12A:
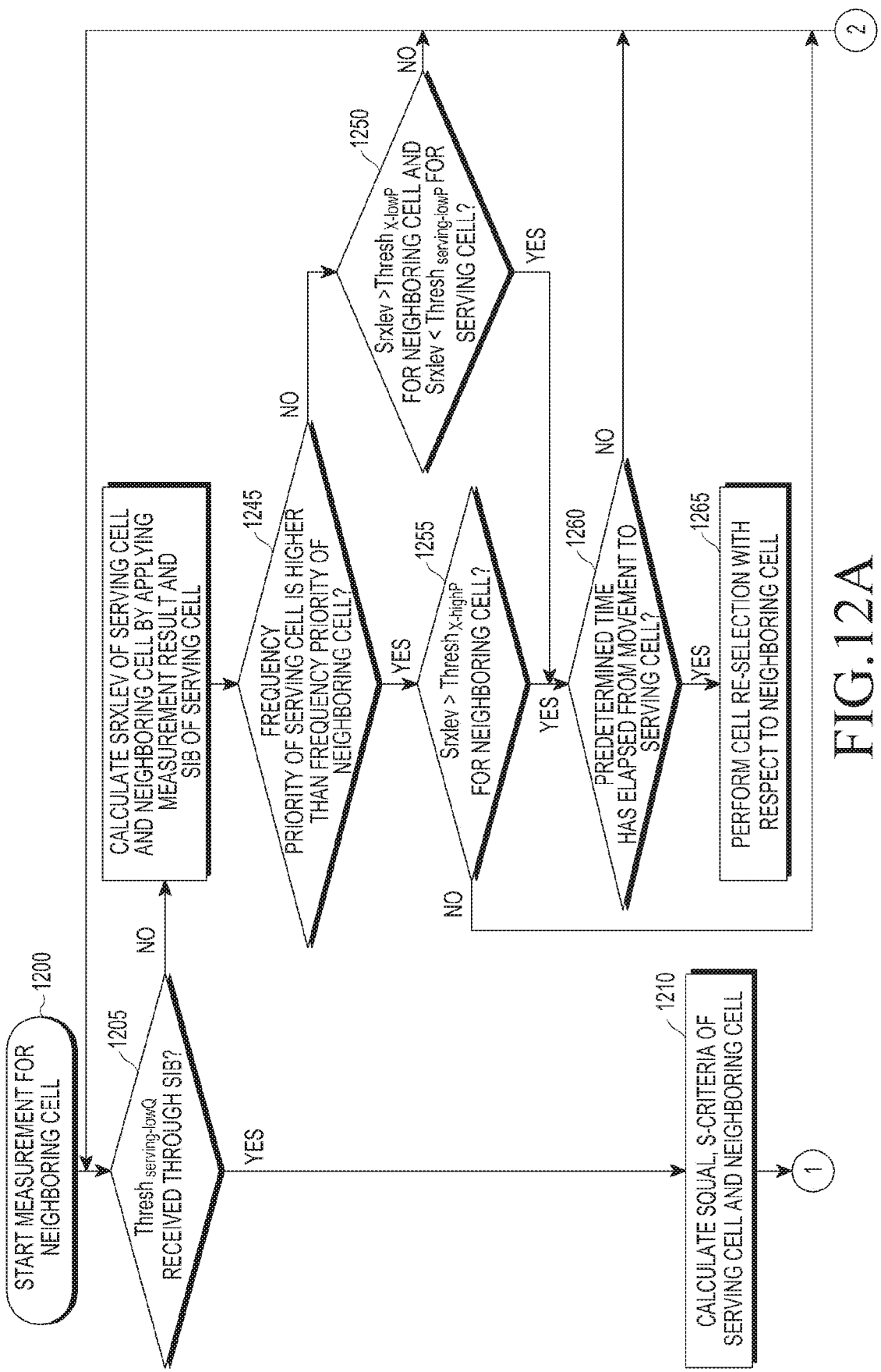
FIGS. 12A and 12B are flowcharts illustrating a method for performing cell re-selection based on whether threshold values considering a reference signal received quality (RSRQ) are provided, in a wireless communication system according to an embodiment of the present disclosure.
Figure 12B:
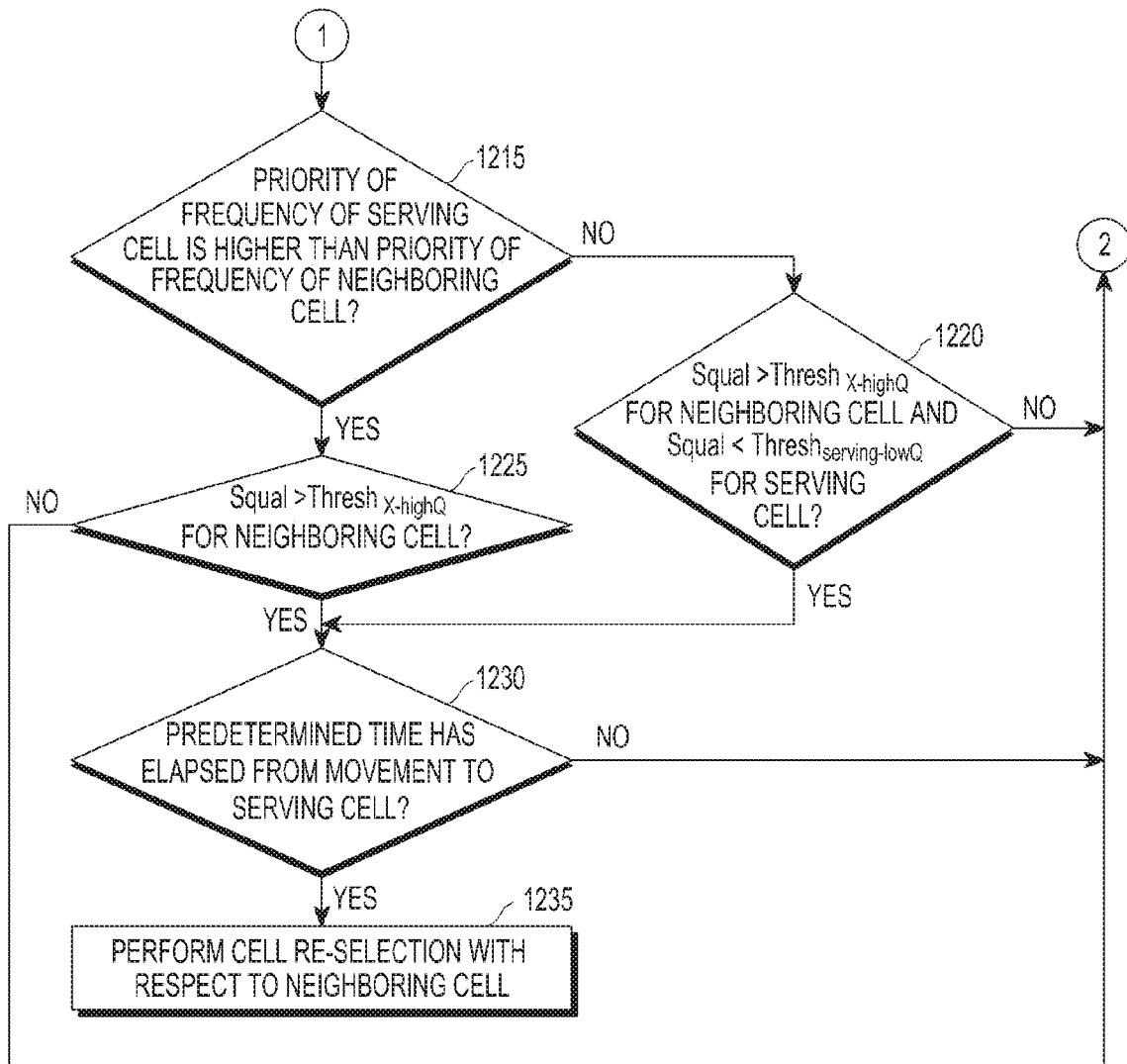

FIGS. 12A and 12B are flowcharts illustrating a method for performing cell re-selection based on whether threshold values considering an RSRQ are provided, in a wireless communication system according to an embodiment of the present disclosure. That is, the embodiment illustrated in FIGS. 12A and 12B shows a process of performing cell re-selection according to whether threshold values $\text{Thresh}_{serving-lowQ}$, $\text{Thresh}_{X-lowQ}$, and $\text{Thresh}_{X-highQ}$ considering the RSRQ are provided.

Referring to FIG. 12, measurement with respect to a neighboring cell starts in operation 1200. The neighboring cell may be, for example, a neighboring LTE frequency (inter frequency) cell or a neighboring UTRAN cell. In operation 1205, the UE determines whether $\text{Thresh}_{serving-lowQ}$, $\text{Thresh}_{X-lowQ}$, and $\text{Thresh}_{X-highQ}$ are provided as particular threshold values for cell re-selection from the eNB. If so, the UE determines whether to perform cell re-selection based on the RSRQ. In operation 1210, the UE applies a measurement result and the SIB information of the serving cell to calculate Squal, S-Criteria of the serving cell and a neighboring cell. In operation 1215, the UE determines whether a priority of a serving cell frequency is higher than that of a neighboring cell frequency. Otherwise, in operation 1220, the UE determines whether Squal of the neighboring cell is higher than $\text{Thresh}_{X-lowQ}$ and Squal of the serving cell is higher than $\text{Thresh}_{X-lowQ}$ and Squal of the serving cell is lower than $\text{Thresh}_{serving-lowQ}$. Otherwise, the UE goes to operation 1205 without performing cell re-selection.

If Squal of the neighboring cell is higher than $\text{Thresh}_{X-lowQ}$ and Squal of the serving cell is lower than $\text{Thresh}_{serving-lowQ}$ in operation 1220, the UE determines whether a predetermined time (e.g., 1 second) has elapsed from start of movement to the current serving cell in operation 1230. If the predetermined time has not elapsed, the UE performs cell re-selection to the neighboring cell. Meanwhile, if the priority of the serving cell frequency is higher than that of the neighboring cell frequency in operation 1215, the UE determines whether Squal of the neighboring cell is higher than $\text{Thresh}_{X-highQ}$ during a predetermined time $T_{reselection}$ in operation 1225. If Squal of the neighboring cell is higher than $\text{Thresh}_{X-highQ}$, the UE determines whether a predetermined time (e.g., 1 second) has elapsed from start of movement to the serving cell in operation 1230, and if the predetermined time has elapsed, the UE performs cell re-selection in operation 1235.

Meanwhile, if the eNB provides only $\text{Thresh}_{serving-lowP}$, $\text{Thresh}_{X-lowP}$, and $\text{Thresh}_{X-highP}$ considering the RSRP as particular threshold values for cell re-selection, without providing $\text{Thresh}_{serving-lowQ}$, $\text{Thresh}_{X-lowQ}$, and $\text{Thresh}_{X-highQ}$ considering the RSRQ in operation 1205, then the UE performs the above-described process in operations 1240 through 1265, considering $\text{Thresh}_{serving-lowP}$, $\text{Thresh}_{X-lowP}$, and $\text{Thresh}_{X-highP}$, instead of $\text{Thresh}_{serving-lowQ}$, $\text{Thresh}_{X-lowQ}$, and $\text{Thresh}_{X-highQ}$.

More specifically, in operation 1240, the UE applies the measurement result and the SIB information of the serving cell to calculate Srxlev of the serving cell and the neighboring cell. In operation 1245, the UE determines whether the priority of the serving cell frequency is higher than that of the neighboring cell frequency. Otherwise, in operation 1250, the UE determines whether Squal of the neighboring cell is higher than $\text{Thresh}_{X-lowP}$ and Squal of the serving cell is lower than $\text{Thresh}_{serving-lowP}$ during a predetermined time (e.g., a time $T_{reselection}$). Otherwise, the UE goes to operation 1205 without performing cell re-selection. If Srxlev of the neighboring cell is higher than $\text{Thresh}_{X-lowP}$ and Srxlev of the serving cell is lower than $\text{Thresh}_{serving-lowP}$ in operation 1250, the UE determines whether a predetermined time (e.g., 1 second) has elapsed from start of movement to the current serving cell in operation 1260. If the predetermined time has not elapsed, the UE performs cell re-selection to the neighboring cell. Meanwhile, if the priority of the serving cell frequency is higher than that of the neighboring cell frequency in operation 1245, the UE determines whether Srxlev of the neighboring cell is higher than $\text{Thresh}_{X-highP}$ during the predetermined time $T_{reselection}$ in operation 1255. If Srxlev of the neighboring cell is higher than $\text{Thresh}_{X-highP}$, the UE determines whether a predetermined time (e.g., 1 second) has elapsed from start of movement to the serving cell in operation 1260, and if the predetermined time has elapsed, the UE performs cell re-selection in operation 1265.

The embodiment of the present disclosure proposes a method for performing cell re-selection based on existing priority information and whether neighboring cells are connectable in the NM or the EM. The existing cell re-selection rule includes movement from a low-priority frequency to a high-priority frequency. If possible, it is desirable for the UE to be camped on a cell to which the UE is connectable, without a need for the EM. Thus, the embodiment of the present disclosure proposes a method for performing cell re-selection based on whether neighboring cells are connectable in the NM or the EM as well as based on the existing priority information. To this end, the embodiment of the present disclosure proposes various cell re-selection rules Alternatives 1 through 5, considering the EM.

Alternative 1: consider existing priority information, ignoring the EM

Alternative 2: ignore a priority of a frequency connectable in the EM and gives a priority to a frequency connectable in the NM Alternative 3: provide different rules case by case Alternative 4: define parameters applied to a frequency connectable in the EM, separately from parameters applied to existing cell re-selection For example, the eNB provides particular threshold values applied only to EM-related cell re-selection, $\text{Thresh}_{serving-lowforCE}$, $\text{Thresh}_{X-lowPforCE}$, $\text{Thresh}_{X-lowQforCE}$, $\text{Thresh}_{X-highPforCE}$, or $\text{Thresh}_{X-highQforCE}$ to the UE. Here, the particular threshold values correspond to the particular threshold values described in the embodiments of FIGS. 11, 12A, and 12B, and assume the CE mode for application only to the EM-related cell re-selection.

Alternative 5: ignore existing priorities and regard every supportable frequency as having the same priority.

Figure 13:
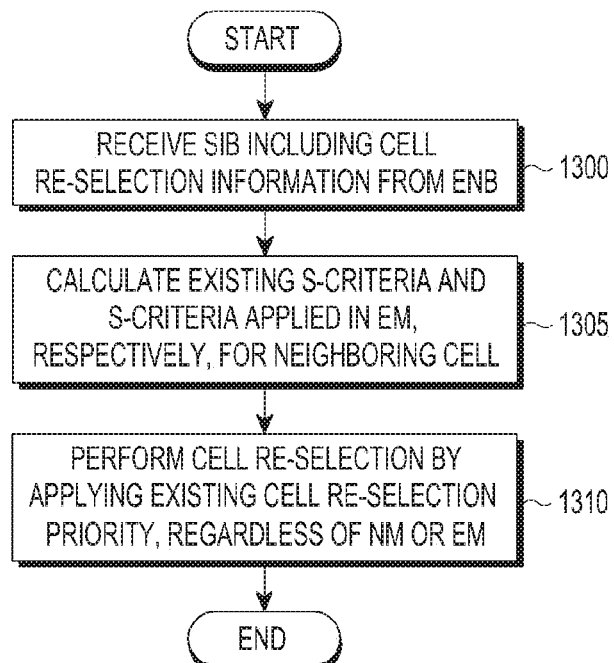
FIGS. 13 through 16 illustrate operations of a UE using various cell re-selection rules considering EM in a wireless communication system according to an embodiment of the present disclosure.

FIG. 13 illustrates an operation of a UE using a cell re-selection rule that considers the EM in a wireless communication system according to an embodiment of the present disclosure, in which the cell re-selection rule is assumed to use Alternative 1.

Referring to FIG. 13, the UE receives cell re-selection related configuration information from SIBs (e.g., SIB 3, SIB 5, and SIB 6) broadcast by the eNB in operation 1300. In operation 1305, the UE calculates, for neighboring cells, existing S-Criteria (i.e., Srxlev and Squal) and the improved S-Criteria applied in the EM, proposed in the embodiment of the present disclosure (i.e., proposed in the embodiment of FIG. 9), respectively. In particular, the UE that determines the cell camped on through the EM may periodically search for a cell connectable in the NM. In operation 1310, the UE applies the existing cell re-selection priority information provided from the eNB regardless of the NM or the EM, and performs cell re-selection. However, when Srxlev or Squal is compared with $Thresh_{serving-lowQ}$, $Thresh_{X-lowQ}$, and $Thresh_{X-highQ}$, the NM cell applies the calculated Srxlev or Squal based on the existing S-Criteria and the EM cell applies the calculated Srxlev or Squal based on the S-Criteria proposed in the embodiment of the present disclosure.

Figure 14:
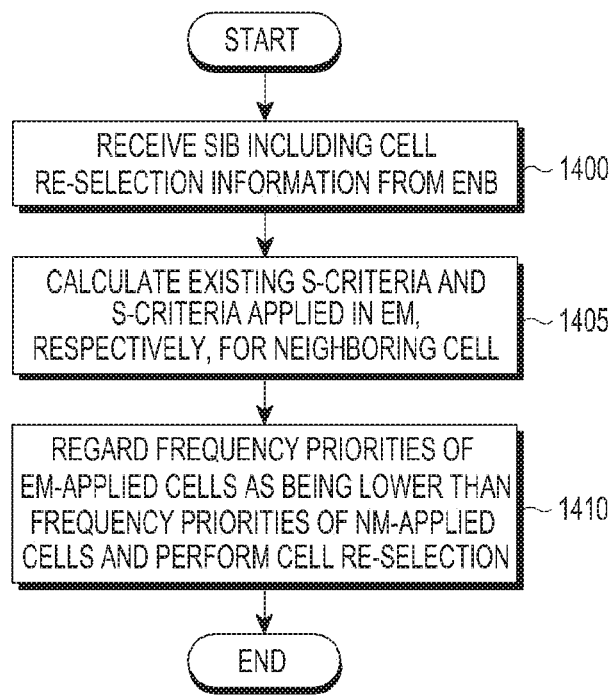

FIG. 14 illustrates an operation of a UE using another cell re-selection rule that considers the EM in a wireless communication system according to an embodiment of the present disclosure, in which the cell re-selection rule is assumed to use Alternative 2.

Referring to FIG. 14, operations 1400 and 1405 are identical to operations 1300 and 1305 of FIG. 13. In operation 1410, the UE regards frequency priorities of EM-applied cells as being lower than those of NM-applied cells at all times. In this case, a cell that is connectable in the EM has a lower priority than a cell that is connectable in the NM at all times. This may be triggered when the eNB transmits an indicator indicating that a cell of the eNB may support the EM through information broadcast by the eNB. For example, let a frequency priority of a cell be '3'. For reference, according to the existing LTE standard, a priority is indicated by a value of 0 through 7, and '0' indicates the highest priority. If the UE considers cell re-selection for the cell in the NM, the UE applies the existing priority '3'. However, if the UE considers cell re-selection for the cell in the EM, the UE may regard the frequency priority of the cell as the lowest priority '7' or a newly defined priority '8'. The UE may implicitly regard the frequency priority of the cell as the lowest priority among priorities of frequencies considered currently. The foregoing UE operations are intended to allow the UE to be camped on a cell that is connectable in the NM, if possible. To cells connectable in the EM, existing frequency priorities are applied.

Table 4 shows an example of Alternative 3 among cell re-selection rules considering the EM. According to various cases listed in Table 4, priorities may be adjusted. In Table 4, the leftmost two columns indicate priorities and modes of a serving cell and a neighboring cell. The last column indicates whether a cell is re-selectable when a signal strength or quality satisfies a condition that allows cell re-selection from the current serving cell to a neighboring cell. Depending on whether the cell is in the CM or the NM, whether to perform cell re-selection may be determined.

TABLE 4

| Serving cell | | Neighboring cell | | Handling of priorities |
|---|---|---|---|---|
| Lower priority | Normal Mode | Higher priority | Normal Mode | Cell re-selection to neighboring cell is possible. |
| Lower priority | Normal Mode | Higher Priority | Extended Coverage Mode | Cell re-selection to neighboring cell is possible by applying Alternatives 1, 2, 4, and 5. |
| Lower priority | Extended coverage Mode | Higher priority | Normal Mode | Cell re-selection to neighboring cell is possible. |
| Lower priority | Extended coverage Mode | Higher priority | Extended coverage Mode | Cell re-selection to neighboring cell is possible. |
| Higher Priority | Normal Mode | Lower priority | Normal Mode | Cell re-selection to neighboring cell is possible. |
| Higher Priority | Normal Mode | Lower priority | Extended coverage Mode | Cell re-selection to neighboring cell is not performed. |
| Higher Priority | Extended coverage Mode | Lower priority | Normal Mode | Cell re-selection to neighboring cell is possible by applying Alternatives 1, 2, 4, and 5. |

TABLE 4-continued

| Serving cell | | Neighboring cell | | Handling of priorities |
|---|---|---|---|---|
| Higher Priority | Extended coverage Mode | Lower priority | Extended coverage Mode | Cell re-selection to neighboring cell is possible. |

Figure 15:
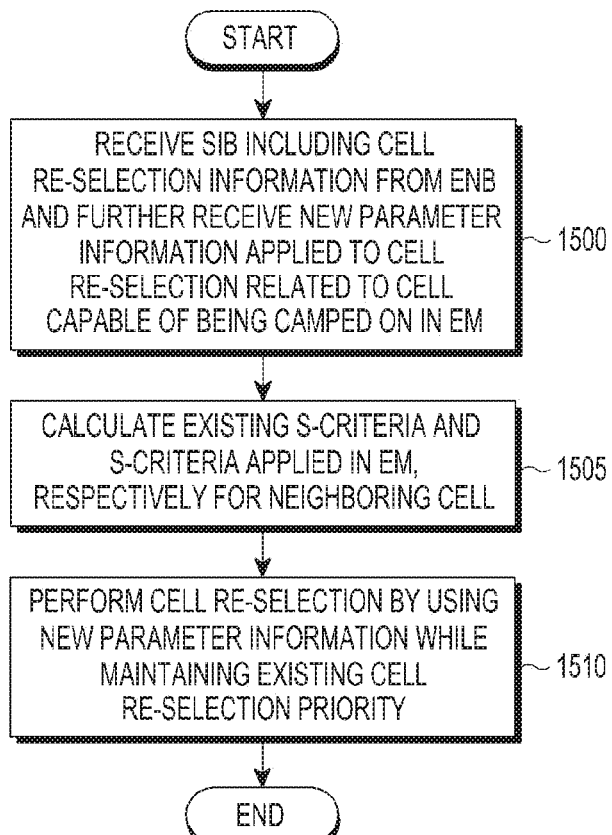

FIG. 15 illustrates an operation of a UE using another cell re-selection rule that considers the EM in a wireless communication system according to an embodiment of the present disclosure, in which the cell re-selection rule is assumed to use Alternative 4.

Referring to FIG. 15, in operation 1500, the UE receives an SIB from the eNB and thus is provided with at least one of $Thresh_{serving-lowforCE}$, $Thresh_{C-lowPforCE}$, $Thresh_{X-lowQforCE}$, and $Thresh_{X-highPforCE}$, $Thresh_{X-highQforCE}$, as new parameter information applied to cell re-selection related to a cell that may camp on in the EM, together with existing cell re-selection configuration information. If the serving cell on which the UE currently is camped is determined in the EM, $Thresh_{serving-lowforCE}$ set to be higher than existing $Thresh_{serving-low}$ is applied. $Thresh_{X-lowPforCE}$ and $Thresh_{X-lowQforCE}$ are applied when cell re-selection is performed with respect to a cell having a low priority on which the UE may camp in the EM. $Thresh_{X-highPforCE}$ and $Thresh_{X-highQforCE}$ are applied when cell re-selection is performed with respect to a cell on which the UE may camp in the EM in spite of a high priority. In operation 1505, the UE calculates, for neighboring cells, existing S-Criteria (i.e., Srxlev and Squal) and the improved S-Criteria applied in the EM, proposed in the embodiment of the present disclosure (i.e., proposed in the embodiment of FIG. 9), respectively.

In operation 1510, the UE performs cell re-selection based on cell re-selection related parameters to be applied to the EM, while maintaining existing cell re-selection priorities. For example, $Thresh_{serving-lowthrCE}$ may increase a probability that the UE re-selects a cell connectable in the NM in spite of a low priority. In case of $Thresh_{X-low}$ < $Thresh_{X-lowPforCE}$ or $Thresh_{X-lowQ}$ < $Thresh_{X-lowQforCE}$, a probability of re-selecting a cell having a low priority in the EM may be reduced. In case of $Thresh_{X-highP}$ < $Thresh_{X-highPforCE}$ or $Thresh_{X-highQ}$ < $Thresh_{X-highQforCE}$, a probability of re-selecting a cell connectable in the EM in spite of a high priority may be reduced. By separately providing cell re-selection related parameters for application to the EM, a probability that the UE is connected to the NM rather than the EM may be increased.

Figure 16:
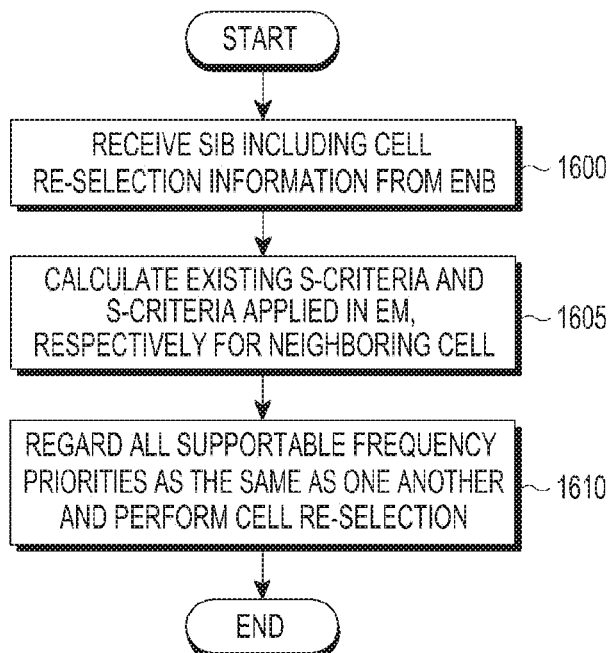

FIG. 16 illustrates an operation of a UE using another cell re-selection rule that considers the EM in a wireless communication system according to an embodiment of the present disclosure, in which the cell re-selection rule is assumed to use Alternative 5.

Referring to FIG. 16, operations 1600 and 1605 are identical to operations 1300 and 1305 of FIG. 13. In operation 1610, the UE regards all supportable frequency priorities as the same as one another at all times. This may be triggered when the eNB transmits an indicator indicating that a cell of the eNB may support the EM through information broadcast by the eNB.

As mentioned before, for cell re-selection, the UE measures serving and neighboring frequencies according to predetermined rules. That is, if the QoS of the serving cell is higher than a threshold $S_{intrasearch}$, measurement is performed only with respect to a frequency having a high priority. For the same intra-frequency, if the QoS of the serving cell is the same as or lower than a threshold value $S_{intrasearch}$, channel measurement is performed for other cells having the same frequency. For another frequency having the priority that is the same as or lower than that of the intra-frequency, if the QoS of the serving cell is the same as or lower than a threshold value $S_{nonintrasearch}$, channel measurement is performed for other cells having the another frequency. This is intended to allow the UE to be camped on a frequency having a high priority, while reducing power consumption of the UE. However, according to the aforementioned frequency priority-based methods, there may be a frequency connectable in the NM in spite of a low frequency priority. In this case, even if connection is possible in the NM, the frequency may not be measured due to a low frequency priority. Therefore, an embodiment of the present disclosure proposes a method for periodically measuring intra-/inter-frequency regardless of a frequency priority, by using a particular timer. The timer starts upon occurrence of a particular event. The particular event may be at least one of the following events:

Event 1: When the UE is camped on a particular cell in the EM, the timer starts or re-starts; and Event 2: After the UE performs intra-/inter-frequency measurement regardless of a frequency priority, the timer starts or re-starts.

Once the timer corresponding to occurrence of the particular event has expired, the UE measures intra-/inter-frequency regardless of a frequency priority. Based on the measurement result, cell re-selection may be performed. That is, a cell connectable in the NM in spite of a low frequency priority may be re-selected. For example, the UE camped on the current serving cell in the CM may re-select a cell having the highest frequency priority among cells connectable in the NM (neighboring cells satisfying a condition that the neighboring cells have channel QoSs higher than a threshold value $Thresh_{X-low}$ and a channel QoS of the current serving cell is lower than $Thresh_{Serving-low}$)

Figure 17:
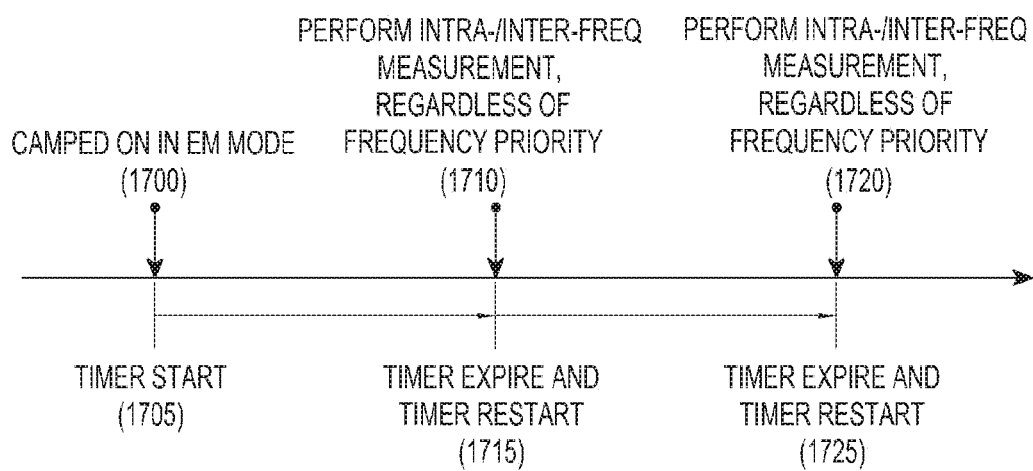
FIG. 17 is a flowchart illustrating a method for measuring intra-/inter-frequency based on a timer in a wireless communication system according to an embodiment of the present disclosure.

FIG. 17 is a flowchart illustrating a method for measuring intra-/inter-frequency based on a timer in a wireless communication system according to an embodiment of the present disclosure.

Referring to FIG. 17, once the UE is camped on a cell in the EM in operation 1700, the UE starts a timer in operation 1705. Until expiry of the timer, the UE saves power without performing intra-/inter-frequency measurement. Once the timer has expired in operation 1715, the UE performs intra-/inter-frequency measurement regardless of a frequency priority in operation 1710. If the period of the timer is too long, the UE may miss a chance to be camped on the most suitable cell in time. Thus, the timer has to be configured according to the requirements of the performance of the UE. After performing intra-/inter-frequency measurement, the UE re-starts the timer in operation 1715. If the re-starting timer has expired in operation 1715, the UE performs intra-/inter-frequency measurement again in operation 1720. The UE then re-start the timer in operation 1725.

Figure 18:
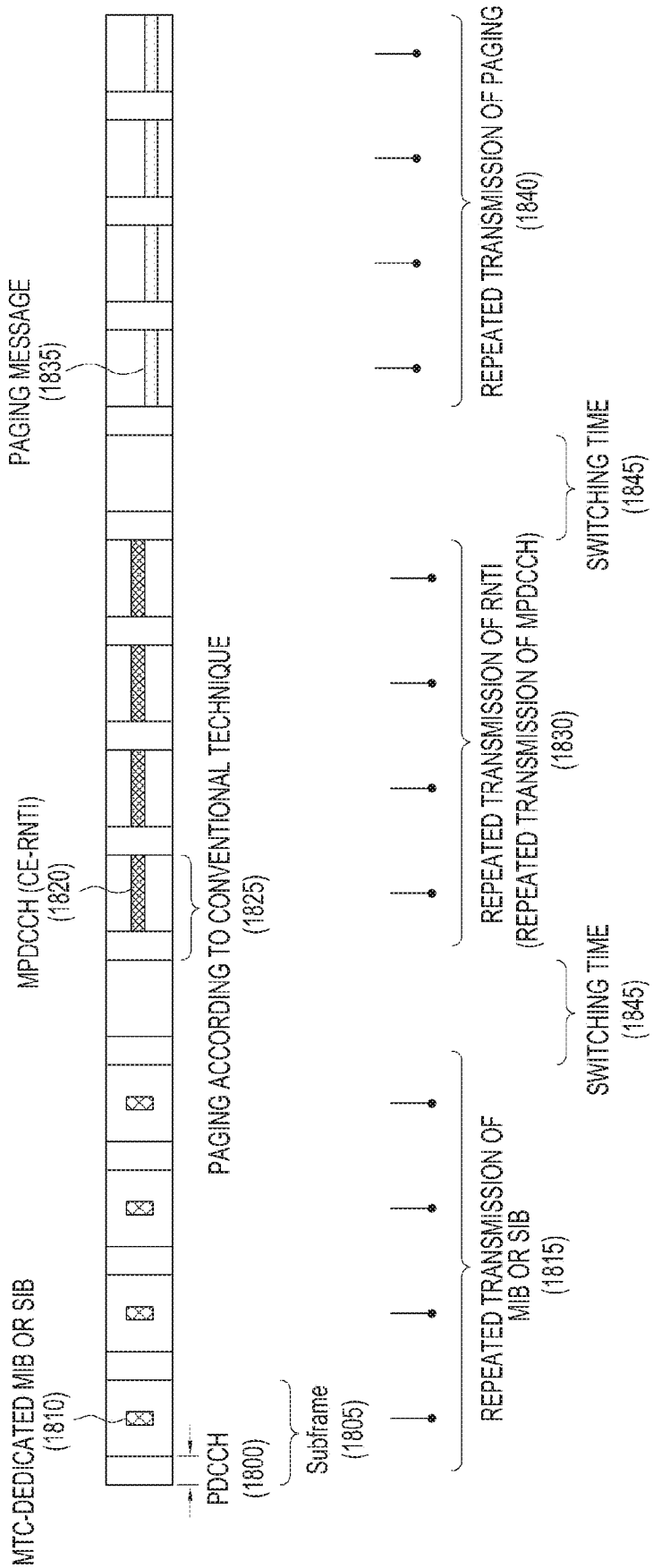
FIG. 18 illustrates system information repeatedly transmitted, PDCCH, and paging in a wireless communication system according to an embodiment of the present disclosure.

FIG. 18 illustrates an example of system information repeatedly transmitted, PDCCH, and paging in a wireless communication system according to an embodiment of the present disclosure.

Referring to FIG. 18, MTC-dedicated master information block (MIB) or system information block (SIB) 2010 including configuration information to be applied by the MTC UE is repeatedly transmitted from the eNB in operation 1815. The MTC UE receives the repeatedly transmitted MIB or SIB, soft-combines the received information, and attempts decoding. The number of repetitions is assumed to be predefined. The repeated transmission and the soft combining are intended to improve the reception performance of the MTC UE. The aforementioned MIB, unlike a conventional MIB, may be transmitted in another radio resource location. The MIB or the SIB may include configuration information regarding a physical downlink control channel for an MTC UE (MPDCCH) and paging. The MPDCCH is transmitted in a physical downlink control channel (PDSCH) resource area like an enhanced PDCCH (ePDCCH) defined in conventional LTE standards. The PDSCH resource area refers to a radio resource area in a subframe 1805 except for an area of a PDCCH 1800. The conventional ePDCCH has been introduced to share a part of information carried in the PDCCH. A low-cost MTC UE may use only a narrow frequency bandwidth like 1.4 MHz, and in this case, the MTC UE may not decode a PDCCH transmitted in a broad bandwidth allocated for a normal UE. Thus, the current embodiment proposes a PDCCH for an MTC UE (i.e., the MPDCCH) 1820 located in the PDSCH resource area, similarly with the ePDCCH, to transmit the information carried in the PDCCH to the MTC UE. The MPDCCH may also be repeatedly transmitted several times and soft-combined in operation 1830. The MPDCCH includes information indicating a radio resource location of an MTC-dedicated paging message 1835. The current embodiment also proposes a coverage extension-radio network temporary identifier (CE-RNTI) as an indicator indicating the MTC-dedicated paging message. The CE-RNTI is used to indicate a paging message like the conventional P-RNTI, and has been proposed to distinguish a conventional paging message from an MTC-dedicated paging message. Configuration information such as the number of repetitions of the MPDCCH, a location of a radio resource used by the MPDCCH, etc., is included in the MIB or the SIB. Locations of a frame and a subframe in which transmission of the MPDCCH including the CE-RNTI starts may be calculated using an equation for calculating conventional paging frame (PF) and paging occasion (PO). Alternatively, the method proposed in Table 2 in the embodiment of the present disclosure may also be used. If reading the CE-RNTI from the MPDCCH and succeeding in obtaining scheduling information of the paging message, the MTC UE receives the paging message by using the scheduling information. At this time, the MTC-dedicated paging message 1835 may also be transmitted repeatedly in operation 1840. The MTC UE may use a frequency band narrower than a system frequency band used by the MTC UE, e.g., a sub-band of 1.4 MHz, etc., and the sub-band may change over time (i.e., frequency hopping). Thus, both a sub-band in which the MTC-dedicated MIB or SIB is transmitted and sub-bands in which the MPDCCH or the paging message is transmitted may be located in different frequency bands. In this case, the MTC UE needs a switching time 1845 for moving a reception sub-band. During the switching time 1845, the MTC UE may switch a radio frequency (RF) module to receive a changed sub-band. The switching time may be previously determined or may be set by the eNB through the MTC-dedicated MIB or SIB. Generally, the switching time is defined as 0 through N subframe time intervals. If the sub-band in which the MTC-dedicated MIB or SIB is transmitted and the sub-bands in which the MPDCCH or the paging message is transmitted use the same frequency band without being changed, the switching time may not be necessary.

Figure 19:
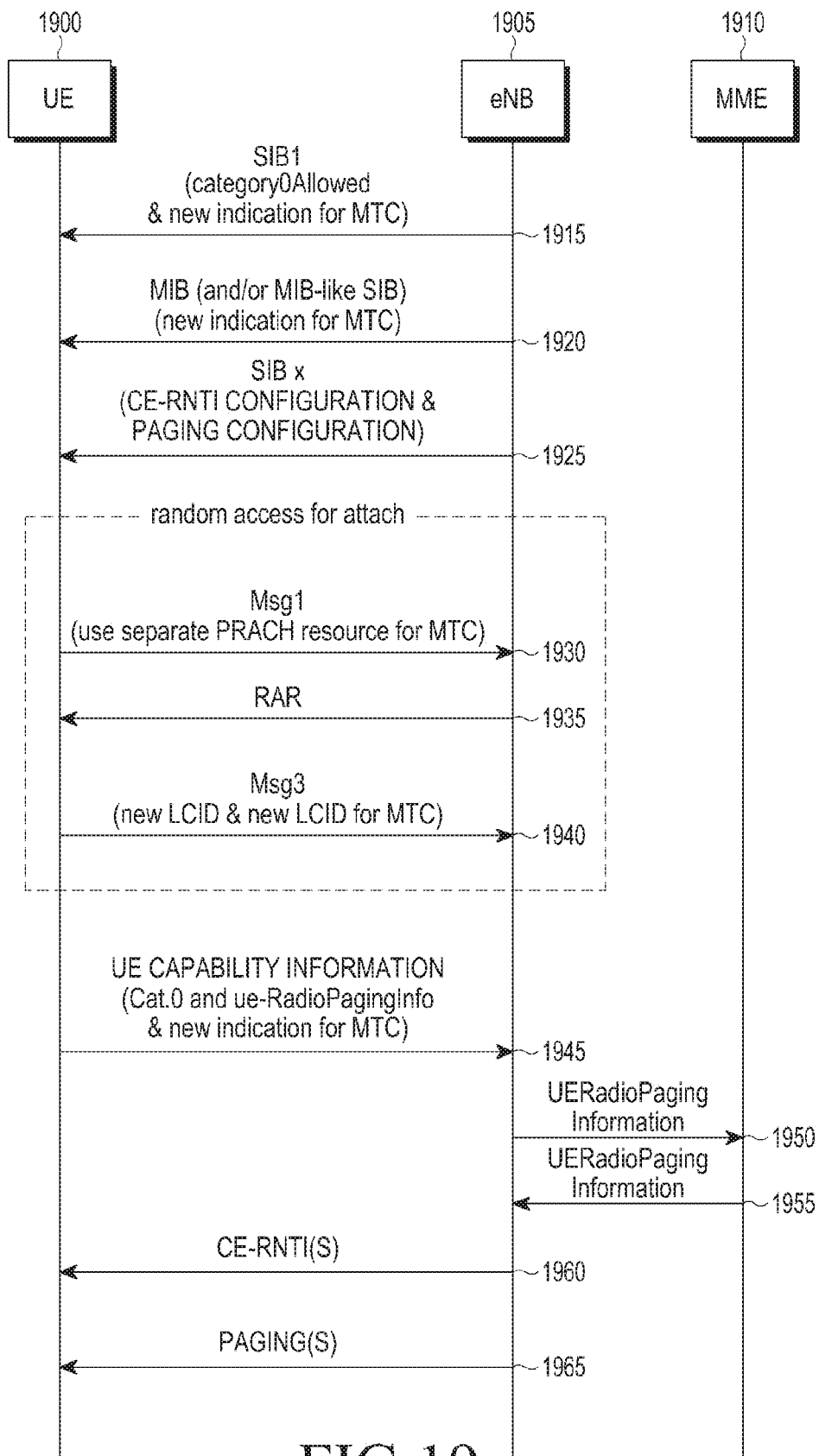
FIG. 19 illustrates a process of receiving paging in a wireless communication system according to an embodiment of the present disclosure.

FIG. 19 illustrates a process of receiving paging in a wireless communication system according to an embodiment of the present disclosure.

Referring to FIG. 19, in operations 1915 and 1920, an eNB 1905 indicates, to a UE 1900, whether the eNB 1905 supports a repeated transmission function for service area extension, by using conventional SIB 1 or the MTC-dedicated MIB. If the eNB 1905 supports the repeated transmission function, various types of messages such as ePDCCH, MTC-dedicated system information (i.e., MIB, SIB, etc.), preamble, RAR, msg 3, and the like as well as a paging message are repeatedly transmitted for service area extension, and the UE may receive the messages, in an embodiment of the present disclosure. The SIB 1 may include an indicator indicating whether Category #0 is supported.

In operation 1925, configuration information related to paging message reception is provided to the UE through the aforementioned MTC-dedicated MIB or a new MTC-dedicated SIB. Herein, the configuration information includes at least one of configuration information of the MPDCCH including the CE-RNTI and paging configuration information.

In an embodiment of the present disclosure, the configuration information of the MPDCCH may include at least one of information shown in Table 5 through Table 8.

TABLE 5

| Information | Contents |
| --- | --- |
| Scheduling Information of MPDCCH | This information indicates a location of a radio resource on a frequency/time axis in which the MPDCCH is transmitted. The MTC UE may use a sub-band such as 1.4 MHz, being narrower than a system frequency band used by a normal UE, such that the scheduling information may include information about a sub-band in which the MPDCCH is transmitted. The scheduling information may include information about a start time in which the MPDCCH is transmitted. The start point in which the MPDCCH is transmitted may be determined using the above-described methods in the embodiment of the present disclosure (e.g. the methods shown in Table 1 and Table 2), but the start point in which the MPDCCH is transmitted may be directly notified to the UE through the MTC-dedicated MIB or SIB. |
| The number of repeated transmissions of the MPDCCH | This information indicates the number of repeated transmissions of the MPDCCH. Transmission of the MPDCCH starts in a scheduling location indicated by the MTC-dedicated MIB or SIB. As stated above, the number of repeated transmissions of the MPDCCH may be set through the MTC-dedicated MIB or SIB, but the UE may determine the necessary number of repeated transmissions using the number of preamble retransmissions until successful preamble transmission in the PRACH process, cell measurement information such as RSRP/RSRQ, etc., and may notify the determined number of repeated transmissions to the eNB. If determining based on the foregoing information that a more number of repeated transmissions or a less number of repeated transmissions than a default number of repeated transmissions provided by the eNB is needed, the UE notifies so to the eNB through an RRC message. The eNB having received the RRC message resets the changed number of repeated transmissions, and depending on circumstances, the eNB may ignore a request of the MTC UE. |

TABLE 6

| Information | Contents |
| --- | --- |
| csi-RS-ConfigZPId-Second | This information indicates the rate matching parameters in addition to those indicated by re-MappingQCL-ConfigId. E-UTRAN configures this field only when tm10 is configured. |
| dmrs-ScramblingSequenceInt | This information denotes the DMRS scrambling sequence initialization parameter |
| EPDCCH-SetConfig | This information provides EPDCCH configuration set. See TS 36.213 [23, 9.1.4]. E-UTRAN configures at least one EPDCCH-SetConfig when EPDCCH-Config is configured. |
| numberPRB-Pairs | This information indicates the number of physical resource-block pairs used for the EPDCCH set. Value n2 corresponds to 2 physical resource-block pairs; n4 corresponds to 4 physical resource-block pairs and so on. Value n8 is not supported if dl-Bandwidth is set to 6 resource blocks. |

TABLE 7

| Information | Contents |
| --- | --- |
| pucch-ResourceStartOffset | This information denotes PUCCH format 1a and 1b resource starting offset for the EPDCCH set. |
| re-MappingQCL-ConfigId | This information indicates the starting OFDM symbol, the related rate matching parameters and quasi co-location assumption for EPDCCH when the UE is configured with tm10. This information provides the identity of a configured PDSCH-RE-MappingQCL-Config. E-UTRAN configures this field only when tm10 is configured. |
| resourceBlockAssignment | This information indicates the index to a specific combination of physical resource-block pair for EPDCCH set. |
| setConfigId | This information indicates the identity of the EPDCCH configuration set. |

TABLE 8

| Information | Contents |
| --- | --- |
| startSymbol | This information indicates the OFDM starting symbol for any EPDCCH and PDSCH scheduled by EPDCCH on the same cell. If not present, the UE shall release the configuration and shall derive the starting OFDM symbol of EPDCCH and PDSCH scheduled by EPDCCH from PCFICH. Values 1, 2, and 3 are applicable for dl-Bandwidth greater than 10 resource blocks. Values 2, 3, and 4 are applicable otherwise. E-UTRAN does not configure the field for UEs configured with tm10. |
| subframePatternConfig | This information indicates configuring the subframes which the UE shall monitor the UE-specific search space on EPDCCH, except for pre-defined rules. If the field is not configured when EPDCCH is configured, the UE shall monitor the UE-specific search space on EPDCCH in all subframes except for pre-defined rules. |
| transmissionType | This information indicates whether distributed or localized EPDCCH transmission mode is used. |

In an embodiment of the present disclosure, the paging message-related configuration information may include at least one of information shown in Table 9.

TABLE 9

| Information | Contents |
| --- | --- |
| The number of repeated transmissions of the paging message | This information indicates the number of repeated transmissions of the paging message. As stated above, the number of repeated transmissions of the paging message may be set through the MTC-dedicated MIB or SIB, but the UE may determine the necessary number of repeated transmissions using the number of preamble retransmissions until successful preamble transmission in the PRACH process, cell measurement information such as RSRP/RSRQ, etc., and may notify the determined number of repeated transmissions to the eNB. If determining based on the foregoing information that a more number of repeated transmissions or a less number of repeated transmissions than a default number of repeated transmissions provided by the eNB is needed, the UE notifies so to the eNB through an RRC message. The eNB having received the RRC message resets the changed number of repeated transmissions, and depending on circumstances, the eNB may ignore a request of the MTC UE. |
| First transmission timing or offset of the paging message transmitted repeatedly | Repeated transmission of the paging message starts according to a predefined condition or at an explicitly indicated timing. For indication, particular offset information may be used. The predefined condition may define that transmission starts in an $x^{th}$ frame or subframe after completion of repeated transmissions of the MPDCCH. Alternatively, in an embodiment of the present disclosure, a time for transmission of the paging message may be determined using the methods described in Table 1 and Table 2. |

Referring back to FIG. 19, operations 1930 and 1940 indicate a random access procedure for attach. In operation 1930, the MTC UE having received the system information successfully attempts random access. The MTC UE transmits random access preambles to the eNB by using a separate dedicated physical random access channel (PRACH) radio resource, instead of PRACH radio resources used by normal UEs. The use of the separate PRACH radio resource instead of the PRACH radio resources used by the normal UE is intended to allow the eNB to recognize whether the UE transmitting the preamble is a normal UE or an MTC UE. The eNB may recognize a type of the UE that transmits the preamble based on the PRACH radio resource in which the preamble is transmitted, and may determine whether to repeatedly transmit a random access response (RAR) message based on the recognized type. The location of the separate MTC-dedicated PRACH radio resource may be predefined or provided to the MTC-dedicated UE through the MTC-dedicated MIB or SIB. After successfully receiving the preamble from the MTC UE, the eNB transmits the RAR to the MTC UE in response to the preamble in operation 1935. In operation 1940, the MTC UE having successfully received the RAR transmits msg3 to the eNB. msg may include a logical channel ID (LCID) indicating that the UE is the MTC UE supporting a mode for extending a service coverage. The eNB having received the LCID may recognize that the mode for extending a service coverage is needed for the MTC UE, and may perform repeated transmissions when sending the paging message later. In operation 1945, the MTC UE sends a UE capability information (UECapabilityInformation) message to the eNB to indicate that the MTC UE supports the mode for extending the service coverage. The UE capability information message may include capability information indicating whether repeated reception is possible, together with existing Cat.0 capability information of the UE (indicating support or non-support).

In operation 1950, the eNB notifies the MME that the MTC UE supports the mode for extending the service coverage. At this time, the eNB may deliver to the MME, capability information indicating whether the UE is capable of repeated reception of the paging message. In operation 1955, if having to send the paging message to the MTC UE, the MME also sends an indication to the MTC UE, indicating that repeated transmissions are needed, together with the paging message. In operation 1960, the eNB provides the CE-RNTI and the scheduling information of the paging message to the MTC UE, by using the MPDCCH. The MPDCCH may also be repeatedly transmitted. After completion of repeated transmissions of the MPDCCH, the eNB sequentially transmits the paging message repeatedly in operation 1965. In the transmissions of operations 1960 and 1965, a robust modulation and coding scheme (MCS) may be used.

Figure 20A:
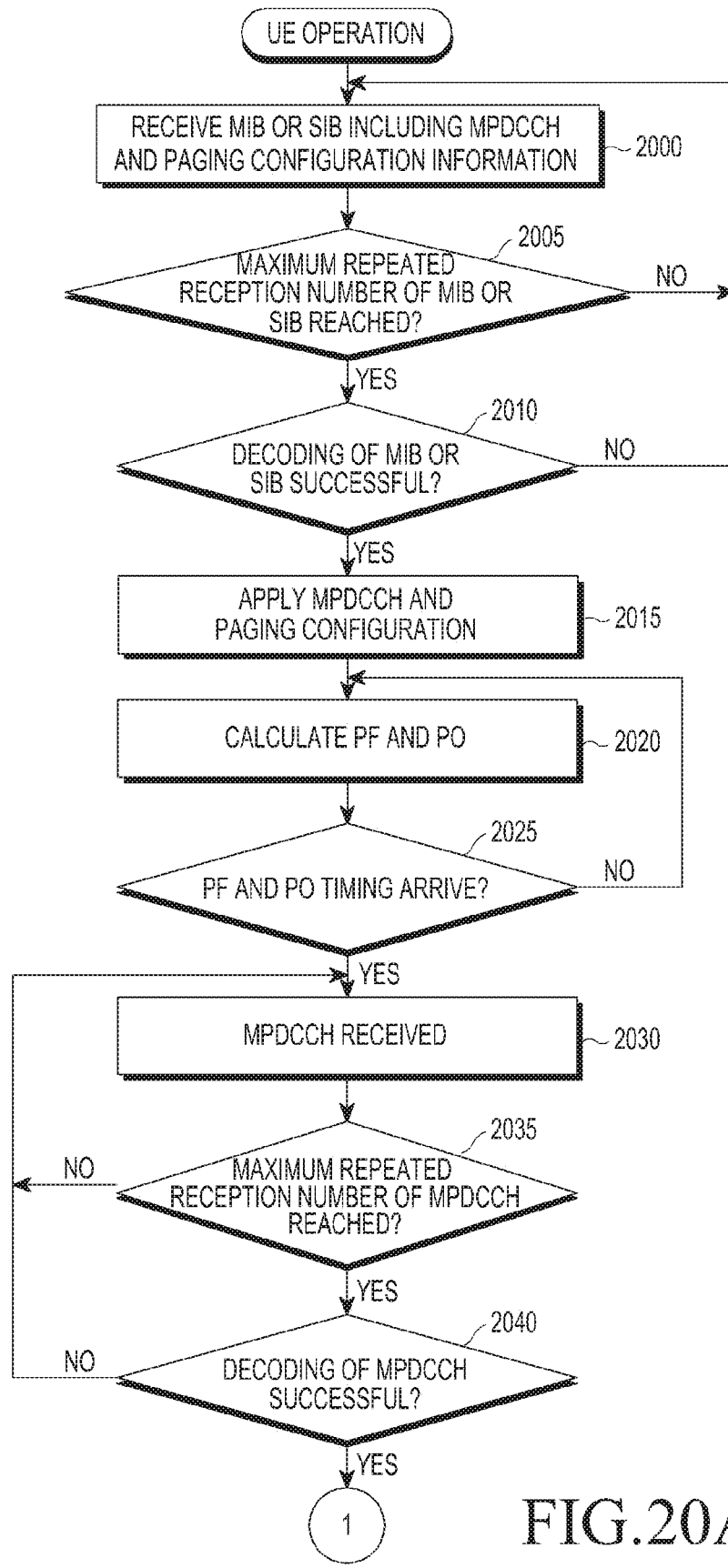
FIGS. 20A and 20B illustrate an operation of receiving paging at an UE in a wireless communication system according to an embodiment of the present disclosure.
Figure 20B:
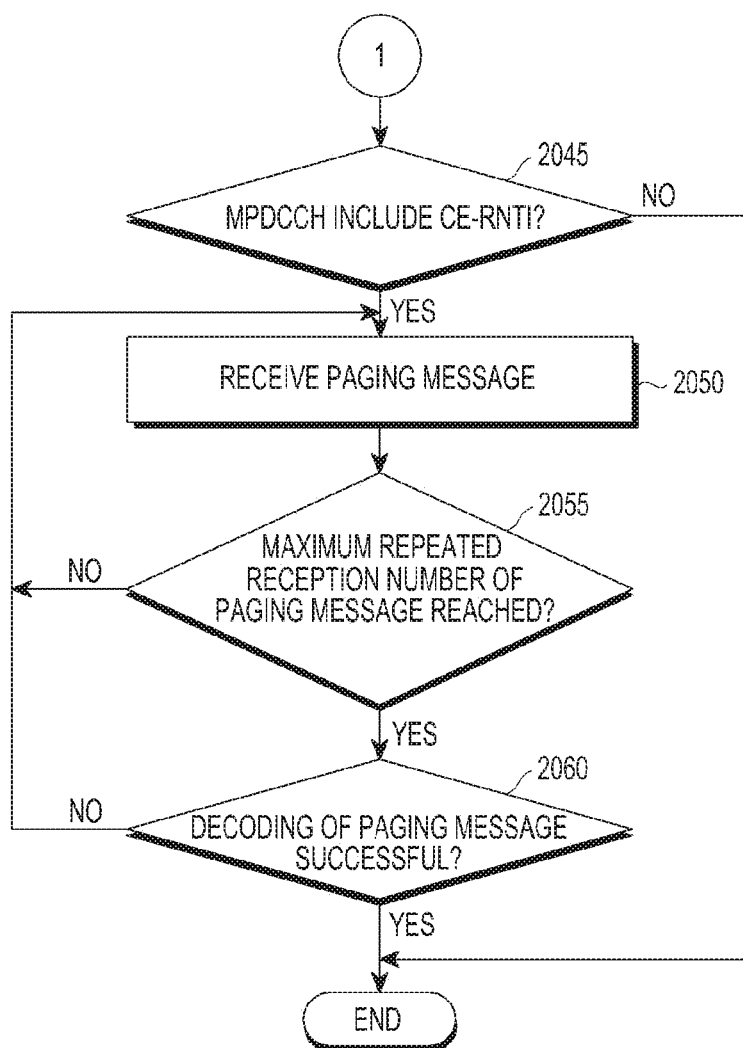

FIGS. 20A and 20B illustrate an operation of receiving paging at an UE in a wireless communication system according to an embodiment of the present disclosure.

Referring to FIGS. 20A and 20B, in order for the MTC UE to extend a service coverage, all messages exchanged with the eNB may be repeatedly transmitted and received. In operation 2000, the MTC UE receives a new MTC-dedicated MIB or SIB including the MTC-dedicated MPDCCH and the paging configuration information. The MTC UE attempts reception of the information up to a maximum repeated reception number in operation 2005, and soft-combines the repeatedly received information to determine whether the information has been successfully decoded in operation 2010. If the decoding has been successfully performed, the MTC UE applies the obtained MPDCCH and the paging configuration information in operation 2015. In operation 2020, the MTC UE calculates a PF and a PO in which the MPDCCH or the paging message is transmitted, to receive the paging message of the MTC UE. The PF and the PO may be calculated using the methods in Table 1 and Table 2. In operation 2025, the MTC UE determines whether the calculated PF and PO timings are up; if so, the MTC UE receives the MPDCCH in operation 2030. The MTC UE attempts reception of the information of the MPDCCH up to a maximum repeated reception number in operation 2035, and soft-combines the repeatedly received MPDCCH information to determine whether the information of the MPDCCH has been successfully decoded in operation 2040. In operation 2045, the MTC UE determines whether the obtained MPDCCH includes the CE-RNTI related to the MTC UE, The CE-RNTI, like the conventional P-RNTI, may be calculated considering a location of a radio resource in which a preamble is transmitted. If the CE-RNTI related to the MTC UE is included in the MPDCCH in operation 2045, the MTC UE receives a paging message by using the scheduling information provided in the MPDCCH in operation 2050. The MTC UE attempts reception of the paging message up to a maximum repeated reception number in operation 2055. In operation 2060, the MTC UE soft-combines information of a repeatedly received paging message to determine whether the information of the paging message has been successfully decoded.

In operations 2000 and 2010 of FIGS. 20A and 20B, the MTC UE determines whether decoding has been successful after receiving the MIB or the SIB up to a maximum repetition number, but the MTC UE may skip reception of the MIB or the SIB for the number of remaining repetitions, if normally receiving the MIB or the SIB prior to the maximum repetition number. Although not shown, the MTC UE may receive the MIB or the SIB up to the maximum repetition number, and if decoding has failed, the MTC UE may determine that reception of the MIB or the SIB has failed and terminate operations or perform a predefined procedure. Likewise, operations not shown in relation to repeated receptions up to the maximum repetition number may be equally applied to reception of the MPDCCH in operations 2030 and 2040 and reception of the paging message in operations 2050 and 2060.

Figure 21:
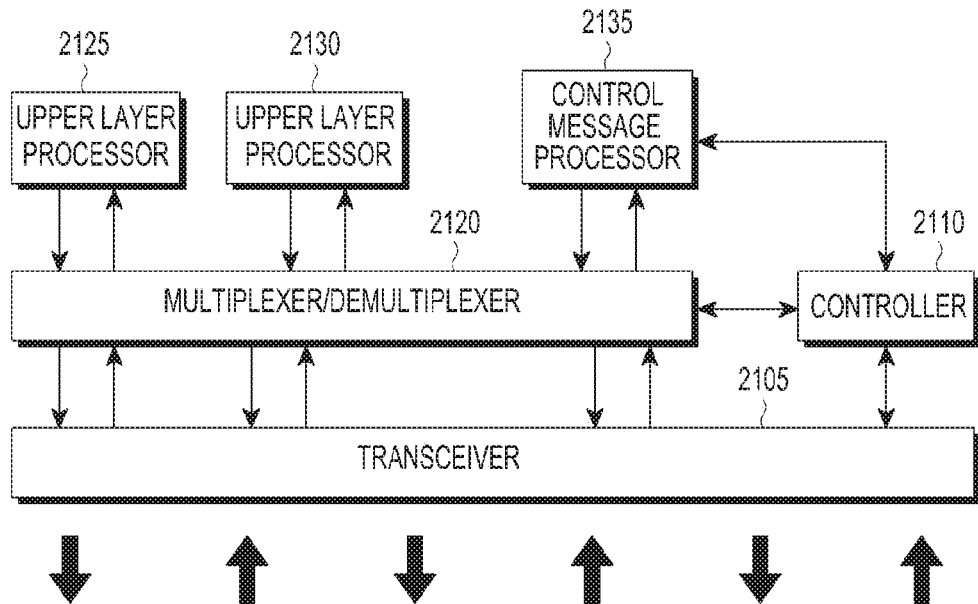
FIG. 21 is a block diagram of a UE in a wireless communication system according to an embodiment of the present disclosure.

FIG. 21 is a block diagram of a UE in a wireless communication system according to an embodiment of the present disclosure.

Referring to FIG. 21, a UE according to an embodiment of the present disclosure may include a transceiver 2105, a controller 2110, a multiplexer/demultiplexer 2120, a control message processor 2135, and upper layer processors 2125 and 2130. The transceiver 2105 receives data and a predetermined control signal through a forward channel of a serving cell and transmits data and a predetermined control signal through a backward channel of the serving cell. If a plurality of serving cells are set, the transceiver 2105 performs data transmission and reception and control signal transmission and reception using the plurality of serving cells. The multiplexer/demultiplexer 2120 multiplexes data generated in the upper layer processors 2125 and 2130 or in the control message processor 2135 or demultiplexes data received from the transceiver 2110, so as to deliver the multiplexed or demultipelxed data to the upper layer processors 2125 and 2130 or the control message processor 2135.

The control message processor 2135 performs a necessary operation by processing a control message received from an eNB, Each of the upper layer processors 2125 and 2130 may be configured for each service, and processes data generated in a user service such as a File Transfer Protocol (FTP) or a Voice over Internet Protocol (VoIP) to deliver the data to the multiplexer/demultiplexer 2115 or processes data delivered from the multiplexer/demultiplexer 2115 to deliver the processed data to an upper-layer service application. The controller 2110 identifies a scheduling instruction received through the transceiver 2105, e.g., UL resource allocation information, and controls the transceiver 2105 and the multiplexer/demultiplexer 2115 to perform UL transmission at a proper time (or point in time) with a proper transmission resource.

In an embodiment of the present disclosure, the control message processor 2135 generates an attach request message or TAU request message to continuously update a current state in a network according to whether a current state of the UE is changed, receives a paging message at a predetermined time according to an operation mode, and determines whether there is a packet to be received in the UE. Although a pluraltiy of elements are shown for detailed illustration in the embodiment of FIG. 21, the UE may be implemented to include a transceiver and a controller according to an embodiment of the present disclosure. Herein the controller controls MTC communication according to the method described with reference to FIGS. 3 through 20B, controls an operation of receiving a paging message, and controls cell (re-)selection.

Figure 22:
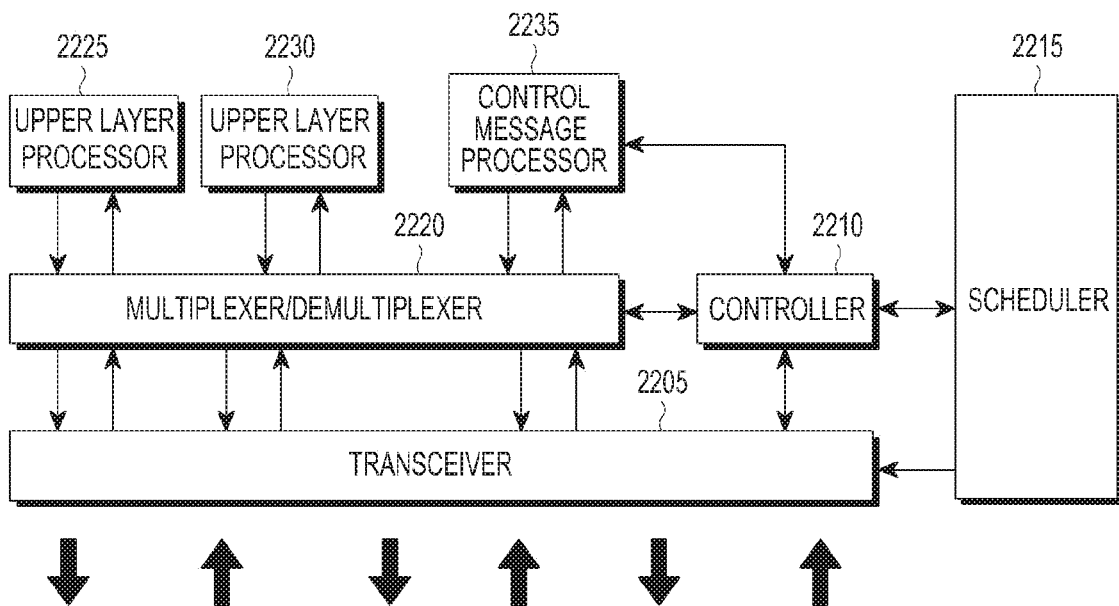
FIG. 22 is a block diagram of an eNB in a wireless communication system according to an embodiment of the present disclosure.

FIG. 22 is a block diagram of an eNB in a wireless communication system according to an embodiment of the present disclosure. The eNB illustrated in FIG. 22 may include a transceiver 2205, a controller 2210, a multiplexer/demultiplexer 2220, a control message processor 2235, upper layer processors 2230 and 2215, and a scheduler 2215.

Referring to FIG. 22, the transceiver 2205 transmits data and a predetermined control signal through DL carriers and receives data and a predetermined control signal through UL carriers. If a plurality of carriers are set, the transceiver 2205 performs data transmission and reception and control signal transmission and reception using the plurality of carriers. The multiplexer/demultiplexer 2220 multiplexes data generated in the upper layer processors 2225 and 2230 or in the control message processor 2235 or demultiplexes data received from the transceiver 2205, so as to deliver the multiplexed or demultipelxed data to the upper layer processors 2225 and 2230, the control message processor 2235, or the controller 2210. The control message processor 2235 processes a control message sent from the UE to perform necessary operations or generates a control message to be sent to the UE and delivers the generated control message to a lower layer. Each of the upper layer processors 2225 and 2230 may be configured for each UE and each service, and processes data generated in a user service such as an FTP or a VoIP to deliver the data to the multiplexer/demultiplexer 2220 or processes data delivered from the multiplexer/demultiplexer 2220 to deliver the processed data to an upper-layer service application.

The controller 2210 determines when the UE transmits channel state information or the like to control the transceiver 2205. The scheduler 2215 allocates a transmission resource to the UE at a proper time, taking a buffer state of the UE, a channel state, and an active time of the UE into account, and controls the transceiver 2205 to process a signal transmitted from the UE or to transmit a signal to the UE. Although a pluraltiy of elements are shown for detailed illustration in the embodiment of FIG. 22, the eNB may be implemented to include a transceiver and a controller according to an embodiment of the present disclosure. Herein the controller controls MTC communication according to the method described with reference to FIGS. 3 through 20B, controls an operation of receiving a paging message, and controls operations related to cell (re-)selection.

According to an embodiment of the present disclosure, a method may be provided to enable the MTC UE to efficiently receive paging while minimizing an influence upon an existing UE. With the foregoing embodiments, it is possible to support communication with the MTC UE needing an extended coverage while minimizing an influence upon existing UEs, and the MTC UE may efficiently receive the paging message and smoothly perform communication. In the embodiment of the present disclosure, methods for cell selection and cell re-selection for the MTC UE are also provided to allow the MTC UE to select or re-select a cell while smoothly communicating with a cell through coverage extension.

The invention claimed is:

1. A method performed by a terminal in a wireless communication system, the method comprising:
   receiving, from a base station, configuration information related to a cell selection;
   applying a cell selection rule based on the configuration information related to the cell selection; and
   in case that the terminal is in an enhanced coverage, performing intra-frequency measurement or inter-frequency measurement based on a result of the applying and a timer for the enhanced coverage.

2. The method of claim 1, wherein the timer for the enhanced coverage starts or re-starts in case that the terminal is camped on a cell associated with the enhanced coverage or at least one of the intra-frequency measurement or the inter-frequency measurement is performed.

3. The method of claim 1, further comprising:
   identifying a cell selection criterion based on the performed measurement; and performing the cell selection based on the identified cell selection criterion, irrespective of a configured frequency priority, while the terminal is in the enhanced coverage.

4. A terminal in a wireless communication system, the terminal comprising:
a transceiver; and
a controller configured to:
receive, from a base station via the transceiver, configuration information related to a cell selection,
apply a cell selection rule based on the configuration information related to the cell selection, and
in case that the terminal is in an enhanced coverage, perform intra-frequency measurement or inter-frequency measurement based on a result of the applying and a timer for the enhanced coverage.

5. The terminal of claim 4, wherein the timer for the enhanced coverage starts or re-starts in case that the terminal is camped on a cell associated with the enhanced coverage or at least one of the intra-frequency measurement or the inter-frequency measurement is performed.

6. The terminal of claim 4, wherein the controller is further configured to:
identify a cell selection criterion based on the performed measurement, and
perform the cell selection based on the identified cell selection criterion, irrespective of a configured frequency priority, while the terminal is in the enhanced coverage.

* * * * *